(12) United States Patent
Nagashima

(10) Patent No.: US 8,610,913 B2
(45) Date of Patent: Dec. 17, 2013

(54) SERVER APPARATUS AND METHOD FOR THE SAME

(75) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 13/442,641

(22) Filed: Apr. 9, 2012

(65) Prior Publication Data

US 2012/0257236 A1 Oct. 11, 2012

(30) Foreign Application Priority Data

Apr. 11, 2011 (JP) .................................. 2011-086941

(51) Int. Cl.
*H04N 1/04* (2006.01)
(52) U.S. Cl.
USPC ........... 358/1.13; 358/474; 358/505; 358/498
(58) Field of Classification Search
USPC .................. 358/1.13, 474, 505, 498, 497
See application file for complete search history.

(56) References Cited

U.S. PATENT DOCUMENTS

2008/0218779 A1* 9/2008 Shirasawa ...................... 358/1.9
2009/0051985 A1* 2/2009 Matsuo ......................... 358/539

FOREIGN PATENT DOCUMENTS

JP 2008-203929 A 9/2008

* cited by examiner

*Primary Examiner* — Houshang Safaipour
(74) *Attorney, Agent, or Firm* — Canon USA Inc. IP Division

(57) ABSTRACT

A driver management unit of a management server develops non-[1:1] type association information generated in a batch association creation mode into [1:1] type association information. On the other hand, the driver management unit stores association information created in an ordinary association creation mode in a data storage unit without performing the development. Further, the driver management unit transmits a list of the association information stored in the data storage unit to a client in response to a request, and distributes a driver selected from the list to the client in such a way as to create a logical printer of a device that corresponds to the association information selected from the list for the client.

8 Claims, 27 Drawing Sheets

FIG.9A

[STEP1] Select Mode to Create Association

| | Next | Cancel |

901 {
○ ORDINARY ASSOCIATION CREATION MODE
⦿ BATCH ASSOCIATION CREATION MODE 902  903

[STEP2] Select Devices

Back | Next | Cancel

| | DEVICE NAME | PDL | IP ADDRESS |
|---|---|---|---|
| ☐ | DEVICE 1a | PCL5 | xxx.xxx.xx1.1 |
| ☑ | DEVICE 2a | PCL5/PCL6/PS/FAX | xxx.xxx.xx2.1 |
| ☑ | DEVICE 2b | PCL5/PCL6 | xxx.xxx.xx2.2 |
| ☑ | DEVICE 2c | PCL5/PCL6 | xxx.xxx.xx2.3 |
| ... | ... | ... | ... |
| ☑ | DEVICE 2n | PCL5/PCL6 | xxx.xxx.xx2.n |
| ☐ | DEVICE 3a | PS | xxx.xxx.xx3.1 |
| ☑ | DEVICE 4a | PCL6 | xxx.xxx.xx4.1 |
| ☑ | DEVICE 4b | PCL6 | xxx.xxx.xx4.2 |
| ☑ | DEVICE 4c | PCL6 | xxx.xxx.xx4.3 |

[STEP3] Select Drivers

Back | Next | Cancel

| | DEVICE NAME | VERSION | PDL |
|---|---|---|---|
| ☐ | DRIVER A | v3.00 | PCL5 |
| ☐ | DRIVER B | v1.00 | PS |
| ☐ | DRIVER C | v5.00 | FAX |
| ☐ | DRIVER D | v1.00 | PCL6 |
| ☑ | DRIVER E | v2.00 | PCL6 |

[STEP4] Association Settings

Printer Setting

| ASSOCIATION NAME | DEVICE NAME | DRIVER NAME | PRINTER NAME TO BE GENERATED | IP ADDRESS |
|---|---|---|---|---|
| ASSOCIATION D_1 | DEVICE 2a | DRIVER E | Room2_color_MFP_No.1 | xxx.xxx.xx2.1 |
| ASSOCIATION D_2 | DEVICE 2b | | Room2_color_MFP_No.2 | xxx.xxx.xx2.2 |
| ASSOCIATION D_3 | DEVICE 2c | | Room2_color_MFP_No.3 | xxx.xxx.xx2.3 |
| ... | ... | | ... | ... |
| ASSOCIATION D_n | DEVICE 2n | | Room2_color_MFP_No.n | xxx.xxx.xx2.n |
| ASSOCIATION D_(n+1) | DEVICE 4a | | Room4_monochrome_SFP_No.1 | xxx.xxx.xx4.1 |
| ASSOCIATION D_(n+2) | DEVICE 4b | | Room4_monochrome_SFP_No.2 | xxx.xxx.xx4.2 |
| ASSOCIATION D_(n+3) | DEVICE 4c | | Room4_monochrome_SFP_No.3 | xxx.xxx.xx4.3 |

Set Alternative Association Name

ALTERNATIVE ASSOCIATION NAME: ASSOCIATION D

Back  Next  Cancel 931, 931a, 931b, 932, 933, 934, 935

FIG.9E

[STEP5] Confirm Registration Settings

Printer Setting

| ASSOCIATION NAME | DEVICE NAME | DRIVER NAME | PRINTER NAME TO BE GENERATED | IP ADDRESS |
|---|---|---|---|---|
| ASSOCIATION D_1 | DEVICE 2a | DRIVER E | Room2_color_MFP_No.1 | xxx.xxx.xx2.1 |
| ASSOCIATION D_2 | DEVICE 2b | | Room2_color_MFP_No.2 | xxx.xxx.xx2.2 |
| ASSOCIATION D_3 | DEVICE 2c | | Room2_color_MFP_No.3 | xxx.xxx.xx2.3 |
| ... | ... | | ... | ... |
| ASSOCIATION D_n | DEVICE 2n | | Room2_color_MFP_No.n | xxx.xxx.xx2.n |
| ASSOCIATION D_(n+1) | DEVICE 4a | | Room4_monochrome_SFP_No.1 | xxx.xxx.xx4.1 |
| ASSOCIATION D_(n+2) | DEVICE 4b | | Room4_monochrome_SFP_No.2 | xxx.xxx.xx4.2 |
| ASSOCIATION D_(n+3) | DEVICE 4c | | Room4_monochrome_SFP_No.3 | xxx.xxx.xx4.3 |

941

Set Alternative Association Name

| ALTERNATIVE ASSOCIATION NAME | ASSOCIATION D |

[Back] 942  [Register] 943  [Cancel] 944

FIG.10A

| BATCH ASSOCIATION ID | ASSOCIATION NAME | DEVICE NAME | IP ADDRESS | PRINTER NAME TO BE GENERATED | DRIVER NAME | PDL | VERSION |
|---|---|---|---|---|---|---|---|
| 1 | ASSOCIATION D_1 | DEVICE 2a | xxx.xxx.xx2.1 | Room2_color_MFP_No.1 | DRIVER E | PCL6 | v2.00 |
| 1 | ASSOCIATION D_2 | DEVICE 2b | xxx.xxx.xx2.2 | Room2_color_MFP_No.2 | DRIVER E | PCL6 | v2.00 |
| 1 | ASSOCIATION D_3 | DEVICE 2c | xxx.xxx.xx2.3 | Room2_color_MFP_No.3 | DRIVER E | PCL6 | v2.00 |
| ... | ... | ... | ... | ... | ... | ... | ... |
| 1 | ASSOCIATION D_n | DEVICE 2n | xxx.xxx.xx2.n | Room2_color_MFP_No.n | DRIVER E | PCL6 | v2.00 |
| 1 | ASSOCIATION D_(n+1) | DEVICE 4a | xxx.xxx.xx4.1 | Room4_monochrome_SFP_No.1 | DRIVER E | PCL6 | v2.00 |
| 1 | ASSOCIATION D_(n+2) | DEVICE 4b | xxx.xxx.xx4.2 | Room4_monochrome_SFP_No.2 | DRIVER E | PCL6 | v2.00 |
| 1 | ASSOCIATION D_(n+3) | DEVICE 4c | xxx.xxx.xx4.3 | Room4_monochrome_SFP_No.3 | DRIVER E | PCL6 | v2.00 |

FIG.10B

| BATCH ASSOCIATION ID | ALTERNATIVE ASSOCIATION NAME |
|---|---|
| 1 | ASSOCIATION D |

FIG.12A

ASSOCIATION SELECTION SCREEN

| | ASSOCIATION NAME | PRINTER INFORMATION | | | DRIVER INFORMATION | | |
|---|---|---|---|---|---|---|---|
| | | DEVICE NAME | IP ADDRESS | PRINTER NAME TO BE GENERATED | DRIVER NAME | PDL | VERSION |
| ☑ | ASSOCIATION A | DEVICE 1 | xxx.xxx.xx1.1 | Room1_monochrome_MFP_No.1 | DRIVER A | PCL5 | v3.00 |
| ☐ | ASSOCIATION B | DEVICE 2a | xxx.xxx.xx2.1 | Room2_color_MFP_No.1_TEXT | DRIVER A | PCL5 | v3.00 |
| | | | | Room2_color_MFP_No.1_IMAGE | DRIVER B | PS | v1.00 |
| | | | | Room2_color_MFP_No.1_FAX | DRIVER C | FAX | v5.00 |
| ☐ | ASSOCIATION C | DEVICE 2a | xxx.xxx.xx2.1 | Room2_color_MFP_No.1 | DRIVER A | PCL5 | v3.00 |
| | | DEVICE 2b | xxx.xxx.xx2.2 | Room2_color_MFP_No.2 | | | |
| | | DEVICE 2c | xxx.xxx.xx2.3 | Room2_color_MFP_No.3 | | | |
| ☐ | ASSOCIATION D_1 | DEVICE 2a | xxx.xxx.xx2.1 | Room2_color_MFP_No.1 | DRIVER E | PCL6 | v2.00 |
| ☐ | ASSOCIATION D_2 | DEVICE 2b | xxx.xxx.xx2.2 | Room2_color_MFP_No.2 | DRIVER E | PCL6 | v2.00 |
| ☐ | ASSOCIATION D_3 | DEVICE 2c | xxx.xxx.xx2.3 | Room2_color_MFP_No.3 | DRIVER E | PCL6 | v2.00 |
| ... | ... | ... | ... | ... | ... | ... | ... |
| ☐ | ASSOCIATION D_n | DEVICE 2n | xxx.xxx.xx2.n | Room2_color_MFP_No.n | DRIVER E | PCL6 | v2.00 |
| ☐ | ASSOCIATION D_(n+1) | DEVICE 4a | xxx.xxx.xx4.1 | Room4_monochrome_SFP_No.1 | DRIVER E | PCL6 | v2.00 |
| ☐ | ASSOCIATION D_(n+2) | DEVICE 4b | xxx.xxx.xx4.2 | Room4_monochrome_SFP_No.2 | DRIVER E | PCL6 | v2.00 |
| ☐ | ASSOCIATION D_(n+3) | DEVICE 4c | xxx.xxx.xx4.3 | Room4_monochrome_SFP_No.3 | DRIVER E | PCL6 | v2.00 |

FIG.12B

| ASSOCIATION SELECTION SCREEN | | | | | | | |
|---|---|---|---|---|---|---|---|
| | ASSOCIATION NAME | PRINTER INFORMATION | | | DRIVER INFORMATION | | |
| | | DEVICE NAME | IP ADDRESS | PRINTER NAME TO BE GENERATED | DRIVER NAME | PDL | VERSION |
| ☐ | ASSOCIATION B | DEVICE 2a | xxx.xxx.xx2.1 | Room2_color_MFP_No.1_TEXT | DRIVER A | PCL5 | v3.00 |
| | | | | Room2_color_MFP_No.1_IMAGE | DRIVER B | PS | v1.00 |
| | | | | Room2_color_MFP_No.1_FAX | DRIVER C | FAX | v5.00 |
| ☐ | ASSOCIATION C | DEVICE 2a | xxx.xxx.xx2.1 | Room2_color_MFP_No.1 | DRIVER A | PCL5 | v3.00 |
| ☐ | ASSOCIATION D_1 | DEVICE 2a | xxx.xxx.xx2.1 | Room2_color_MFP_No.1 | DRIVER E | PCL6 | v2.00 |

FIG.13

|     | DRIVER NAME | VERSION | PDL |
|-----|-------------|---------|------|
| ☐ | DRIVER A | v3.00 | PCL5 |
| ☐ | DRIVER B | v1.00 | PS |
| ☐ | DRIVER C | v5.00 | FAX |
| ☐ | DRIVER D | v1.00 | PCL6 |
| ☑ | DRIVER E | v2.00 | PCL6 |

[STEP3] Select Drivers

Back | Next | Cancel | X:Y

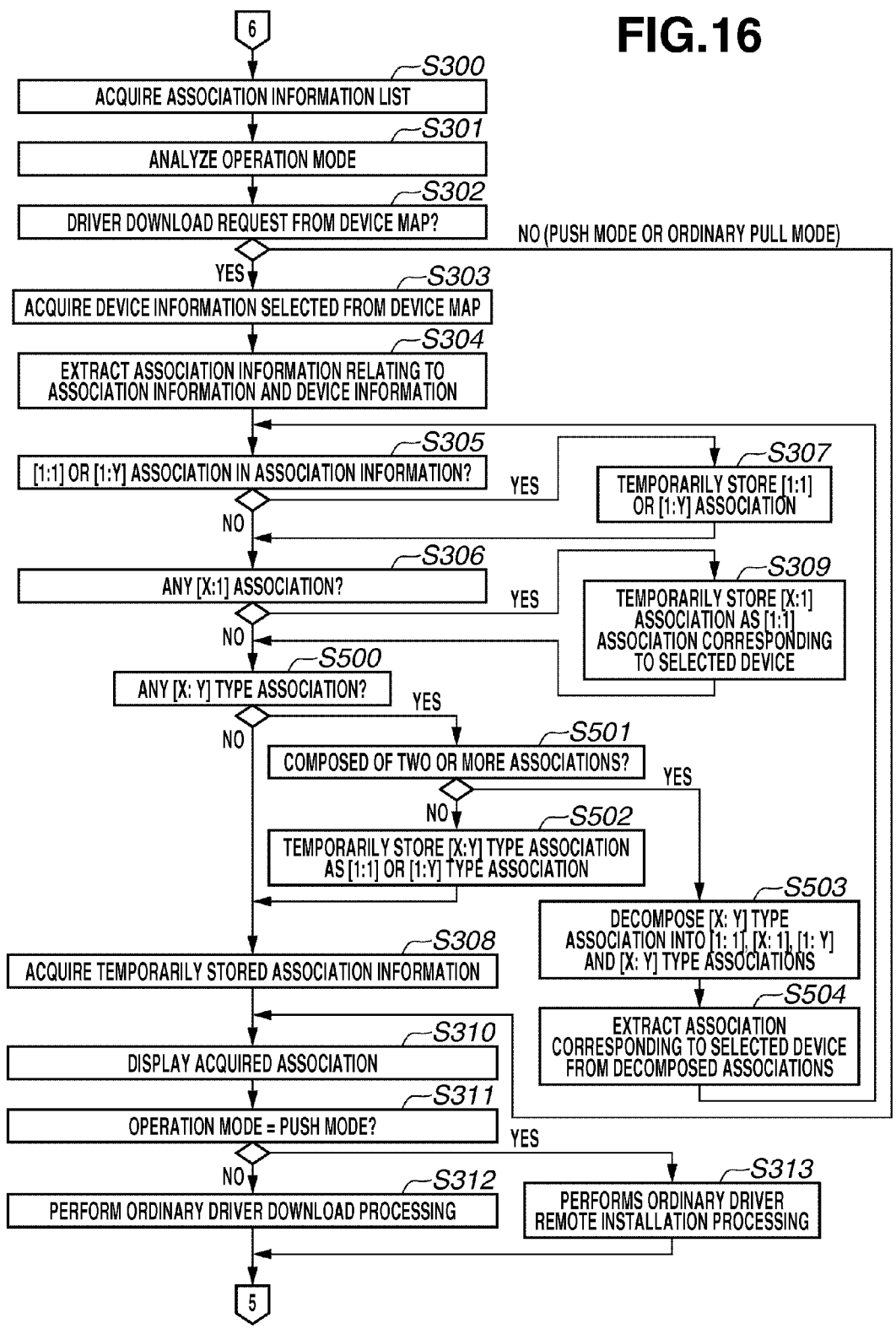

FIG.17A

ASSOCIATION SELECTION SCREEN

| | ASSOCIATION NAME | PRINTER INFORMATION ||| DRIVER INFORMATION |||
|---|---|---|---|---|---|---|---|
| | | DEVICE NAME | IP ADDRESS | PRINTER NAME TO BE GENERATED | DRIVER NAME | PDL | VERSION |
| ☑ | ASSOCIATION A | DEVICE 1 | xxx.xxx.xx1.1 | Room1_monochrome_MFP_No.1 | DRIVER A | PCL5 | v3.00 |
| ☐ | ASSOCIATION B | DEVICE 2a | xxx.xxx.xx2.1 | Room2_color_MFP_No.1_TEXT | DRIVER A | PCL5 | v3.00 |
| | | | | Room2_color_MFP_No.1_IMAGE | DRIVER B | PS | v1.00 |
| | | | | Room2_color_MFP_No.1_FAX | DRIVER C | FAX | v5.00 |
| ☐ | ASSOCIATION C | DEVICE 2a | xxx.xxx.xx2.1 | Room2_color_MFP_No.1 | DRIVER A | PCL5 | v3.00 |
| | | DEVICE 2b | xxx.xxx.xx2.2 | Room2_color_MFP_No.2 | | | |
| | | DEVICE 2c | xxx.xxx.xx2.3 | Room2_color_MFP_No.3 | | | |
| ☐ | ASSOCIATION D_1 | DEVICE 2a | xxx.xxx.xx2.1 | Room2_color_MFP_No.1 | DRIVER E | PCL6 | v2.00 |
| ☐ | ASSOCIATION D_2 | DEVICE 2b | xxx.xxx.xx2.2 | Room2_color_MFP_No.2 | DRIVER E | PCL6 | v2.00 |
| ☐ | ASSOCIATION D_3 | DEVICE 2c | xxx.xxx.xx2.3 | Room2_color_MFP_No.3 | DRIVER E | PCL6 | v2.00 |
| ... | | | | ... | ... | | |
| ☐ | ASSOCIATION D_n | DEVICE 2n | xxx.xxx.xx2.n | Room2_color_MFP_No.n | DRIVER E | PCL6 | v2.00 |
| ☐ | ASSOCIATION D_(n+1) | DEVICE 4a | xxx.xxx.xx4.1 | Room4_monochrome_SFP_No.1 | DRIVER E | PCL6 | v2.00 |
| ☐ | ASSOCIATION D_(n+2) | DEVICE 4b | xxx.xxx.xx4.2 | Room4_monochrome_SFP_No.2 | DRIVER E | PCL6 | v2.00 |
| ☐ | ASSOCIATION D_(n+3) | DEVICE 4c | xxx.xxx.xx4.3 | Room4_monochrome_SFP_No.3 | DRIVER E | PCL6 | v2.00 |
| ☐ | ASSOCIATION E | DEVICE 2a | xxx.xxx.xx2.1 | Room2_color_MFP_No.1_TEXT | DRIVER A | PCL5 | v3.00 |
| | | | | Room2_color_MFP_No.1_FAX | DRIVER C | FAX | v5.00 |
| | | DEVICE 3a | xxx.xxx.xx3.1 | Room3_color_SFP_No.1 | DRIVER B | PS | v1.00 |
| | | DEVICE 4a | xxx.xxx.xx4.1 | Room4_monochrome_SFP_No.1 | DRIVER D | PCL6 | v1.00 |
| | | DEVICE 4b | xxx.xxx.xx4.2 | Room4_monochrome_SFP_No.2 | | | |
| | | DEVICE 4c | xxx.xxx.xx4.3 | Room4_monochrome_SFP_No.3 | | | |

FIG.17B

ASSOCIATION SELECTION SCREEN

| | ASSOCIATION NAME | PRINTER INFORMATION ||| DRIVER INFORMATION |||
|---|---|---|---|---|---|---|---|
| | | DEVICE NAME | IP ADDRESS | PRINTER NAME TO BE GENERATED | DRIVER NAME | PDL | VERSION |
| ☐ | ASSOCIATION B | DEVICE 2a | xxx.xxx.xx2.1 | Room2_color_MFP_No.1_TEXT | DRIVER A | PCL5 | v3.00 |
| | | | | Room2_color_MFP_No.1_IMAGE | DRIVER B | PS | v1.00 |
| | | | | Room2_color_MFP_No.1_FAX | DRIVER C | FAX | v5.00 |
| ☐ | ASSOCIATION C | DEVICE 2a | xxx.xxx.xx2.1 | Room2_color_MFP_No.1 | DRIVER A | PCL5 | v3.00 |
| ☐ | ASSOCIATION D_1 | DEVICE 2a | xxx.xxx.xx2.1 | Room2_color_MFP_No.1 | DRIVER E | PCL6 | v2.00 |
| ☐ | ASSOCIATION E | DEVICE 2a | xxx.xxx.xx2.1 | Room2_color_MFP_No.1_TEXT | DRIVER A | PCL5 | v3.00 |
| | | | | Room2_color_MFP_No.1_FAX | DRIVER C | FAX | v5.00 |

FIG.19

ASSOCIATION LIST

| ASSOCIATION TYPE | ASSOCIATION NAME | PRINTER INFORMATION ||| DRIVER INFORMATION ||
|---|---|---|---|---|---|---|
| | | DEVICE NAME | IP ADDRESS | PRINTER NAME TO BE GENERATED | DRIVER NAME | PDL | VERSION |
| [1:1] | ASSOCIATION A | DEVICE 1 | xxx.xxx.xx1.1 | Room1_monochrome_MFP_No.1 | DRIVER A | PCL5 | v3.00 |
| [1:Y] | ASSOCIATION B | DEVICE 2a | xxx.xxx.xx2.1 | Room2_color_MFP_No.1_TEXT | DRIVER A | PCL5 | v3.00 |
| | | | | Room2_color_MFP_No.1_IMAGE | DRIVER B | PS | v1.00 |
| | | | | Room2_color_MFP_No.1_FAX | DRIVER C | FAX | v5.00 |
| [X:1] | ASSOCIATION C | DEVICE 2a | xxx.xxx.xx2.1 | Room2_color_MFP_No.1 | DRIVER A | PCL5 | v3.00 |
| | | DEVICE 2b | xxx.xxx.xx2.2 | Room2_color_MFP_No.2 | | | |
| | | DEVICE 2c | xxx.xxx.xx2.3 | Room2_color_MFP_No.3 | | | |
| [X:1] | ASSOCIATION D | DEVICE 2a | xxx.xxx.xx2.1 | Room2_color_MFP_No.1 | DRIVER E | PCL6 | v2.00 |
| | | DEVICE 2b | xxx.xxx.xx2.2 | Room2_color_MFP_No.2 | | | |
| | | DEVICE 2c | xxx.xxx.xx2.3 | Room2_color_MFP_No.3 | | | |
| | | ... | ... | ... | | | |
| | | DEVICE 2n | xxx.xxx.xx2.n | Room2_color_MFP_No.n | | | |
| | | DEVICE 4a | xxx.xxx.xx4.1 | Room4_monochrome_SFP_No.1 | | | |
| | | DEVICE 4b | xxx.xxx.xx4.2 | Room4_monochrome_SFP_No.2 | | | |
| | | DEVICE 4c | xxx.xxx.xx4.3 | Room4_monochrome_SFP_No.3 | | | |
| [X:Y] | ASSOCIATION E | DEVICE 2a | xxx.xxx.xx2.1 | Room2_color_MFP_No.1_TEXT | DRIVER A | PCL5 | v3.00 |
| | | | | Room2_color_MFP_No.1_FAX | DRIVER C | FAX | v5.00 |
| | | DEVICE 3a | xxx.xxx.xx3.1 | Room3_color_SFP_No.1 | DRIVER B | PS | v1.00 |
| | | DEVICE 4a | xxx.xxx.xx4.1 | Room4_monochrome_SFP_No.1 | DRIVER D | PCL6 | v1.00 |
| | | DEVICE 4b | xxx.xxx.xx4.2 | Room4_monochrome_SFP_No.2 | | | |
| | | DEVICE 4c | xxx.xxx.xx4.3 | Room4_monochrome_SFP_No.3 | | | |

FIG. 20A

ASSOCIATION SELECTION SCREEN

| | ASSOCIATION NAME | PRINTER INFORMATION | | | DRIVER INFORMATION | | |
|---|---|---|---|---|---|---|---|
| | | DEVICE NAME | IP ADDRESS | PRINTER NAME TO BE GENERATED | DRIVER NAME | PDL | VERSION |
| ☐ | ASSOCIATION A | DEVICE 1 | xxx.xxx.xx1.1 | Room1_monochrome_MFP_No.1 | DRIVER A | PCL5 | v3.00 |
| ☐ | ASSOCIATION B | DEVICE 2a | xxx.xxx.xx2.1 | Room2_color_MFP_No.1_TEXT | DRIVER A | PCL5 | v3.00 |
| | | | | Room2_color_MFP_No.1_IMAGE | DRIVER B | PS | v1.00 |
| | | | | Room2_color_MFP_No.1_FAX | DRIVER C | FAX | v5.00 |
| ☐ | ASSOCIATION C | DEVICE 2a | xxx.xxx.xx2.1 | Room2_color_MFP_No.1 | DRIVER A | PCL5 | v3.00 |
| | | DEVICE 2b | xxx.xxx.xx2.2 | Room2_color_MFP_No.2 | | | |
| | | DEVICE 2c | xxx.xxx.xx2.3 | Room2_color_MFP_No.3 | | | |
| ☐ | ASSOCIATION D | DEVICE 2a | xxx.xxx.xx2.1 | Room2_color_MFP_No.1 | DRIVER E | PCL6 | v2.00 |
| | | DEVICE 2b | xxx.xxx.xx2.2 | Room2_color_MFP_No.2 | | | |
| | | DEVICE 2c | xxx.xxx.xx2.3 | Room2_color_MFP_No.3 | | | |
| | | ... | ... | ... | | | |
| | | DEVICE 2n | xxx.xxx.xx2.n | Room2_color_MFP_No.n | | | |
| | | DEVICE 4a | xxx.xxx.xx4.1 | Room4_monochrome_SFP_No.1 | | | |
| | | DEVICE 4b | xxx.xxx.xx4.2 | Room4_monochrome_SFP_No.2 | | | |
| | | DEVICE 4c | xxx.xxx.xx4.3 | Room4_monochrome_SFP_No.3 | | | |
| ☐ | ASSOCIATION E | DEVICE 2a | xxx.xxx.xx2.1 | Room2_color_MFP_No.1_TEXT | DRIVER A | PCL5 | v3.00 |
| | | | | Room2_color_MFP_No.1_FAX | DRIVER C | FAX | v5.00 |
| | | DEVICE 3a | xxx.xxx.xx3.1 | Room3_color_SFP_No.1 | DRIVER B | PS | v1.00 |
| | | DEVICE 4a | xxx.xxx.xx4.1 | Room4_monochrome_SFP_No.1 | DRIVER D | PCL6 | v1.00 |
| | | DEVICE 4b | xxx.xxx.xx4.2 | Room4_monochrome_SFP_No.2 | | | |
| | | DEVICE 4c | xxx.xxx.xx4.3 | Room4_monochrome_SFP_No.3 | | | |

FIG.20B

ASSOCIATION SELECTION SCREEN

| | ASSOCIATION NAME | PRINTER INFORMATION | | | DRIVER INFORMATION | | |
|---|---|---|---|---|---|---|---|
| | | DEVICE NAME | IP ADDRESS | PRINTER NAME TO BE GENERATED | DRIVER NAME | PDL | VERSION |
| ☐ | ASSOCIATION A | DEVICE 1 | xxx.xxx.xx1.1 | Room1_monochrome_MFP_No.1 | DRIVER A | PCL5 | v3.00 |
| ☐ | ASSOCIATION B | DEVICE 2a | xxx.xxx.xx2.1 | Room2_color_MFP_No.1_TEXT | DRIVER A | PCL5 | v3.00 |
| ☐ | ASSOCIATION B | DEVICE 2a | xxx.xxx.xx2.1 | Room2_color_MFP_No.1_IMAGE | DRIVER B | PS | v1.00 |
| ☐ | ASSOCIATION B | DEVICE 2a | xxx.xxx.xx2.1 | Room2_color_MFP_No.1_FAX | DRIVER C | FAX | v5.00 |
| ☐ | ASSOCIATION C | DEVICE 2a | xxx.xxx.xx2.1 | Room2_color_MFP_No.1 | DRIVER A | PCL5 | v3.00 |
| ☐ | ASSOCIATION C | DEVICE 2b | xxx.xxx.xx2.2 | Room2_color_MFP_No.2 | DRIVER A | PCL5 | v3.00 |
| ☐ | ASSOCIATION C | DEVICE 2c | xxx.xxx.xx2.3 | Room2_color_MFP_No.3 | DRIVER A | PCL5 | v3.00 |
| ☐ | ASSOCIATION D_1 | DEVICE 2a | xxx.xxx.xx2.1 | Room2_color_MFP_No.1 | DRIVER E | PCL6 | v2.00 |
| ☐ | ASSOCIATION D_2 | DEVICE 2b | xxx.xxx.xx2.2 | Room2_color_MFP_No.2 | DRIVER E | PCL6 | v2.00 |
| ☐ | ASSOCIATION D_3 | DEVICE 2c | xxx.xxx.xx2.3 | Room2_color_MFP_No.3 | DRIVER E | PCL6 | v2.00 |
| ⋮ | ⋮ | ⋮ | ⋮ | ⋮ | ⋮ | ⋮ | ⋮ |
| ☐ | ASSOCIATION D_n | DEVICE 2n | xxx.xxx.xx2.n | Room2_color_MFP_No.n | DRIVER E | PCL6 | v2.00 |
| ☐ | ASSOCIATION D_(n+1) | DEVICE 4a | xxx.xxx.xx4.1 | Room4_monochrome_SFP_No.1 | DRIVER E | PCL6 | v1.00 |
| ☐ | ASSOCIATION D_(n+2) | DEVICE 4b | xxx.xxx.xx4.2 | Room4_monochrome_SFP_No.2 | DRIVER E | PCL6 | v1.00 |
| ☐ | ASSOCIATION D_(n+3) | DEVICE 4c | xxx.xxx.xx4.3 | Room4_monochrome_SFP_No.3 | DRIVER E | PCL6 | v1.00 |
| ☐ | ASSOCIATION E | DEVICE 2a | xxx.xxx.xx2.1 | Room2_color_MFP_No.1_TEXT | DRIVER A | PCL5 | v3.00 |
| ☐ | ASSOCIATION E | DEVICE 2a | xxx.xxx.xx2.1 | Room2_color_MFP_No.1_FAX | DRIVER C | FAX | v5.00 |
| ☐ | ASSOCIATION E | DEVICE 3a | xxx.xxx.xx3.1 | Room3_color_SFP_No.1 | DRIVER B | PS | v1.00 |
| ☐ | ASSOCIATION E | DEVICE 4a | xxx.xxx.xx4.1 | Room4_monochrome_SFP_No.1 | DRIVER D | PCL6 | v1.00 |
| ☐ | ASSOCIATION E | DEVICE 4b | xxx.xxx.xx4.2 | Room4_monochrome_SFP_No.2 | DRIVER D | PCL6 | v1.00 |
| ☐ | ASSOCIATION E | DEVICE 4c | xxx.xxx.xx4.3 | Room4_monochrome_SFP_No.3 | DRIVER D | PCL6 | v1.00 |

FIG.20C

ASSOCIATION SELECTION SCREEN

| | ASSOCIATION NAME | PRINTER INFORMATION | | | DRIVER INFORMATION | | |
|---|---|---|---|---|---|---|---|
| | | DEVICE NAME | IP ADDRESS | PRINTER NAME TO BE GENERATED | DRIVER NAME | PDL | VERSION |
| ☐ | ASSOCIATION B | DEVICE 2a | xxx.xxx.xx2.1 | Room2_color_MFP_No.1_TEXT | DRIVER A | PCL5 | v3.00 |
| ☐ | ASSOCIATION B | DEVICE 2a | xxx.xxx.xx2.1 | Room2_color_MFP_No.1_IMAGE | DRIVER B | PS | v1.00 |
| ☐ | ASSOCIATION B | DEVICE 2a | xxx.xxx.xx2.1 | Room2_color_MFP_No.1_FAX | DRIVER C | FAX | v5.00 |
| ☐ | ASSOCIATION C | DEVICE 2a | xxx.xxx.xx2.1 | Room2_color_MFP_No.1 | DRIVER A | PCL5 | v3.00 |
| ☐ | ASSOCIATION D_1 | DEVICE 2a | xxx.xxx.xx2.1 | Room2_color_MFP_No.1 | DRIVER E | PCL6 | v2.00 |
| ☐ | ASSOCIATION E | DEVICE 2a | xxx.xxx.xx2.1 | Room2_color_MFP_No.1_TEXT | DRIVER A | PCL5 | v3.00 |
| ☐ | ASSOCIATION E | DEVICE 2a | xxx.xxx.xx2.1 | Room2_color_MFP_No.1_FAX | DRIVER C | FAX | v5.00 |

FIG.21A

| CREATION MODE | CREATION FORM | INTERNAL FORM | OPERATION MODE | | |
|---|---|---|---|---|---|
| | | | PUSH MODE | PULL MODE | |
| | | | | ORDINARY MODE | DEVICE MAP USAGE MODE |
| ORDINARY | [1:1] | [1:1] | [1:1] DISPLAY | [1:1] DISPLAY | [1:1] DISPLAY |
| | [1:Y] | [1:Y] | [1:Y] DISPLAY | [1:1] DISPLAY | [1:1] DISPLAY |
| | [X:1] | [X:1] | [X:1] DISPLAY | [1:1] DISPLAY | [1:1] DISPLAY |
| | [X:Y] | [X:Y] | [X:Y] DISPLAY | [1:1] DISPLAY | [1:1] DISPLAY |

FIG.21B

| CREATION MODE | CREATION FORM | INTERNAL FORM | OPERATION MODE | | | |
|---|---|---|---|---|---|---|
| | | | PUSH MODE | PULL MODE | | |
| | | | | ORDINARY MODE | DEVICE MAP USAGE MODE | |
| ORDINARY | [1:1] | [1:1] | [1:1] DISPLAY | [1:1] DISPLAY | [1:1] DISPLAY | ⎫ 2101 |
| | [1:Y] | [1:Y] | [1:Y] DISPLAY | [1:Y] DISPLAY | [1:Y] DISPLAY | |
| | [X:1] | [X:1] | [X:1] DISPLAY | [X:1] DISPLAY | [1:1] DISPLAY | |
| | [X:Y] | [X:Y] | [X:Y] DISPLAY | [X:Y] DISPLAY | [1:1] OR [1:Y] DISPLAY | ⎭ |
| BATCH | [1:1] | [1:1] | [1:1] DISPLAY | [1:1] DISPLAY | [1:1] DISPLAY | ⎫ 2102 |
| | [1:Y] | [1:1] | [1:1] DISPLAY | [1:1] DISPLAY | [1:1] DISPLAY | |
| | [X:1] | [1:1] | [1:1] DISPLAY | [1:1] DISPLAY | [1:1] DISPLAY | |
| | [X:Y] | [1:1] | [1:1] DISPLAY | [1:1] DISPLAY | [1:1] DISPLAY | ⎭ |

SERVER APPARATUS AND METHOD FOR THE SAME

BACKGROUND OF THE INVENTION

1. Field of the Invention

The present invention relates to a technique capable of associating an image forming apparatus with a printer driver and distributing a printer driver to a client apparatus.

2. Description of the Related Art

As conventionally known, a PUSH mode chiefly performed by a management server and a PULL mode chiefly performed by a client are usable as a method for causing the management server to install a driver (i.e., a device driver) suitable for a device accessible via a network to the client.

In the following description, the technical terminology "device" represents an image forming apparatus, such as a printing apparatus (e.g., a single function printer (SFP) or a multifunction peripheral (MFP)) or a scanner apparatus. Further, the technical terminology "driver" represents, for example, a printer driver capable of forming print data to cause an intended device to perform printing when a user of a client has instructed a printing operation via an application installed thereon.

For example, as discussed in Japanese Patent Application Laid-Open No. 2008-203929, in the PUSH mode, when a management server distributes a driver to a client, the management server generates a task including information about a client as distribution destination and association information correlating the driver with a corresponding device. The client executes the task to realize installation of the distributed driver.

In the PULL mode, the user of the client accesses the management server and selects an arbitrary association from an association list. Then, the user downloads related launcher software and installs an intended driver on the client.

The above-described PUSH mode and ordinary PULL mode are collectively referred to as "operation mode." Further, the method for installing a driver in the PUSH mode is referred to as "ordinary driver remote installation processing." The PULL mode is referred to as "ordinary driver download processing."

Further, the technical terminology "association" represents information including device information and driver information. The "association" conformation is, for example, [1:1], [X:1], [1:Y], and [X:Y], which represent a relationship between the number of devices and the number of drivers that are mutually associated.

Further, the technical terminology "device information" includes information, such as a printing apparatus name, a product name, a location, and an internet protocol (IP) address, usable to identify and select an arbitrary device from a plurality of devices to cause the selected device to perform printing.

Further, the technical terminology "driver information" includes information, such as a driver name, a printer name, a version, and a language (e.g., page description language (PDL) to be used), usable to identify and select an arbitrary driver from a plurality of drivers.

As described above, when the device information and the driver information are associated beforehand and if a driver is distributed to a client, it is feasible to install an appropriate driver on the client by selecting the created association without designating a device and a driver in each case.

However, according to the conventional technique, the following issue arises with respect to the operability in selecting an association that correlates the operation mode with the association conformation, as well as installation result of the driver.

In a case where the [1:Y] type association that associates one device with a plurality of drivers is developed into and displayed as [1:1] type associations, a user needs to perform a complicated operation to select <Y> pieces of associations successively. Further, in a case where the [X:1] type association that associates a plurality of devices with one driver is directly displayed to let a user select a desired one, <X> pieces of printer (logical printers) are generated on the client. As described above, according to the conventional device-driver association technique, there is room for further improvement with respect to the operability in the association selection.

SUMMARY OF THE INVENTION

Exemplary embodiments of the present invention relate to a system capable of setting a creation mode for creating an association between an image forming apparatus and a printer driver, with reference to the number of the image forming apparatuses and the number of the printer drivers which are associated. The system according to the present invention can create an association between an image forming apparatus and a printer driver appropriately and can improve the operability in selection of an association, and further can realize the installation appropriately.

According to an aspect of the present invention, a server apparatus includes a creation unit configured to create association information that associates one or a plurality of image forming apparatuses with one or a plurality of printer drivers that correspond to the one or the plurality of image forming apparatuses, a data storage unit configured to store the association information created by the creation unit, a driver storage unit configured to store the printer drivers, a transmission unit configured to transmit a list of the association information stored in the data storage unit to a client apparatus in response to a request from the client apparatus, a reception unit configured to receive association information selected from the list of the association information from the client apparatus, a distribution unit configured to acquire a printer driver that corresponds to the association information selected from the list from the driver storage unit and distribute the acquired printer driver to a predetermined client apparatus, in such a way as to install a logical printer of an image forming apparatus that corresponds to the association information selected from the list and received by the reception unit on the predetermined client apparatus, and a setting unit configured to set a first creation mode or a second creation mode as a creation mode if the creation unit creates association information, wherein, if association information created in a state where the second creation mode is set does not associate an image forming apparatus with a printer driver in a one-to-one relationship, the creation unit develops the association information into association information that associates the image forming apparatus with the printer driver in a one-to-one relationship and store the developed association information in the data storage unit, and further the creation unit stores association information created in a state where the first creation mode is set in the data storage unit without performing the development.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A to 9E illustrate example screens that can be displayed in association creation processing.

FIGS. 10A and 10B illustrate example tables usable to register association information.

FIGS. 12A and 12B illustrate examples of association selection screens.

FIG. 13 illustrates an example of a driver selection screen according to a third exemplary embodiment of the present invention.

FIG. 16 is a flowchart illustrating an example of processing that corresponds to an association display function according to the third exemplary embodiment of the present invention.

FIGS. 17A and 17B illustrate examples of association selection screens according to the third exemplary embodiment of the present invention.

FIG. 19 illustrates an example of an association list that associates devices and drivers.

FIGS. 20A to 20C illustrate examples of association selection screens according to a first exemplary embodiment of the present invention.

FIGS. 21A and 21B illustrate display pattern lists including operation modes and associations.

DESCRIPTION OF THE EMBODIMENTS

Various exemplary embodiments, features, and aspects of the invention will be described in detail below with reference to the drawings.

First, a system according to a first exemplary embodiment is described below.

An "operation mode" according to the present exemplary embodiment includes a device map usage PULL mode (i.e., the PULL mode using a device map), in addition to the above-described ordinary PULL mode. The processing according to the ordinary PULL mode includes causing a client to access to a management server, letting a user select an arbitrary association from an association list, and installing an intended driver on the client by downloading and executing corresponding launcher software. According to the ordinary PULL mode, the user selects an arbitrary association from all association lists.

On the other hand, the processing according to the device map usage PULL mode includes letting a user select an arbitrary association from an association list that corresponds to a device selected on the device map.

Figure 11:
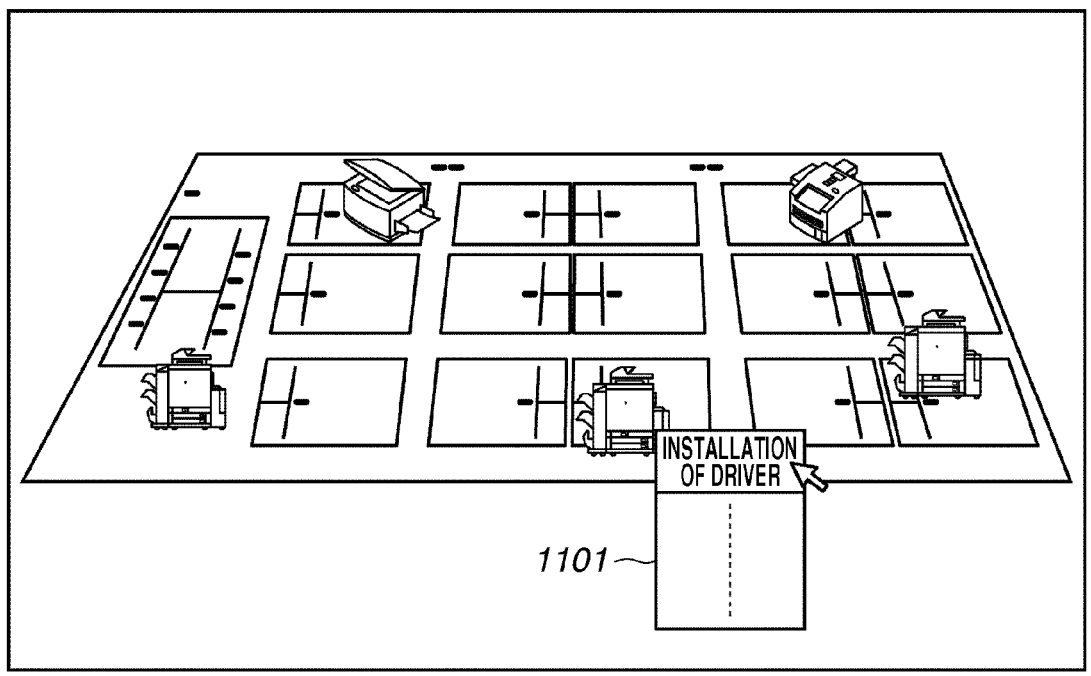
FIG. 11 illustrates an example of a device map.

The device map is one of management server functions, which enables a user to visually manage a plurality of devices, for example, as illustrated in FIG. 11. The device map is different from a list that simply displays devices to be managed. More specifically, the device map includes a symbol representing each device to be managed that is positioned in a setup space (e.g., an office) in which a plurality of devices is located. The device map can realize visual expression and management of respective devices. More specifically, the device map is a screen that visually expresses setup locations of a plurality of devices and a positional relationship of respective devices.

According to the device map usage PULL mode, a user selects an arbitrary device on the device map and presses a menu button or the like to install a corresponding driver. Thus, an association list screen that corresponds to the selected device is opened, the user selects a desired association.

FIG. 19 illustrates an example of a device-driver association list. As illustrated in FIG. 19, the device-driver association list includes "association type", "association name", "device information", "driver information", and the like.

The "association type" is an indication that shows a relationship between a device and a driver. The "association type" corresponds to one of [1:1], [X:1], [1:Y], or [X:Y] (in which X and Y are natural numbers). The [1:1] type association associates one device with one driver. The [X:1] type association associates a plurality of devices with one driver. The [1:Y] type association associates one device with a plurality of drivers. The [X:Y] type association associates a plurality of devices with a plurality of drivers.

The "association name" is a name that can uniquely identify a device-driver association. The example list illustrated in FIG. 19 includes five association names, i.e., [association A], [association B], [association C], [association D], and [association E], in the "association name" filed.

The [association A] is a [1:1] type association that associates a single device with a single driver. The [association B] is a [1:3] type association that associates a single device with three drivers. Similarly, the [association C] is a [3:1] type association that associates three devices with a single driver. The [association D] is an [X:1] type association, in which X represents the number of "n+3" devices. The [association E] is a [5:4] type association. In other words, the [association E] is a complex association that includes a [1:2] type association, a [1:1] type association, and a [3:1] type association.

Next, the "device information" is described in detail below. The "device information" includes information pieces such as "device name", "IP address", and "printer name to be generated".

First, the "device name" has a format [device mn], in which a <m> portion indicates the type of a device. More specifically, the example list illustrated in FIG. 19 includes device-driver associations with respect to four types of devices [device 1n], [device 2n], [device 3n], and [device 4n]. It is needless to say that a unique "IP address" is allocated to each device regardless of the type. For example, two devices [device 2a] and [device 2b] can use the same driver because they are identical to each other in model type. However, these devices [device 2a] and [device 2b] are differentiated in IP address (i.e., output destination).

Further, the "IP address" can be Transmission Control Protocol/Internet Protocol (TCP/IP) or other IP address of each device.

Further, the "printer name to be generated" is conventionally known as a printer name that can be referred to when a driver is installed on a client, to identify a logical printer (or a virtual printer) generated on a client's printer folder as a software interface applicable to a device.

Next, the "driver information" is described in detail below. The "driver information" includes information pieces, such as "driver name", "PDL", and "version".

First, the "driver name" represents the name allocated to each driver. In the present exemplary embodiment, "driver E" is a Generic driver applicable to a plurality of types of devices, such as [device 2n] and [device 4n].

Further, the "PDL" is the page description language, such as [PCL] (printer control language) and [PS] (PostScript), which forms data generated by the driver. Strictly speaking, [FAX] is not the page description language. However, the driver itself indicated by [FAX] is a facsimile driver that forms facsimile transmission data. Further, the "version" represents the version of each driver.

Next, the configuration of each association is described in detail below.

The [association A] is an association that associates a single device having device name [device 1a] and IP address [xxx.xxx.xx1.1] with a single driver having driver name [driver A], PDL [PCL5], and version [v3.00]. If the [association A] is selected, a logical printer having printer name [Room1_monochrome_MFP_No. 1] is generated.

The [association B] is an association that associates a single device having device name [device 2a] with three drivers [driver A], [driver B] and [driver C]. In a case where two or more PDL interpretation functions are loaded on one device, it is feasible to use the same number of drivers.

If the [association B] is selected, three drivers are installed on the client. A logical printer having printer name [Room2_color_MFP_No. 1_TEXT] is generated for the driver having the driver name [driver A]. Further, a logical printer having printer name [Room2_color_MFP_No. 1_IMAGE] is generated for the driver having the driver name [driver B]. Further, a logical printer having printer name [Room2_color_MFP_No. 1_FAX] is generated for the driver having the driver name [driver C].

The [association C] is an association that associates three devices having device names [device 2a], [device 2b], and [device 2c] respectively with a single driver having driver name [driver A], PDL [PCL5], and version [v3.00]. If the [association C] is selected, three drivers [driver A] that are differentiated from each other in output destination port are installed on the client. Further, three logical printers having printer names [Room2_color_MFP_No. 1], [Room2_color_MFP_No. 2], and [Room2_color_MFP_No. 3] are generated for respective drivers [driver A].

The [association D] is an [X:1] type association. The [association D] is an association that associates the Generic driver [driver E] ("PDL"=[PCL6] and "version"=[v2.00]) with a total of n devices having device name [device 2] and three devices having device name [device 4]. If the [association D] is selected, (n+3) logical printers having printer names [Room2_color_MFP_No. 1], [Room2_color_MFP_No. 2], [Room2_color_MFP_No. 3], . . . , [Room2_color_MFP_No. n], [Room4_monochrome_SFP_No. 1], [Room4_monochrome_SFP_No. 2], and [Room4_monochrome_SFP_No. 3] are generated respectively for the Generic driver [driver E].

Characteristics of respective association conformations in relation to installation results are described below.

According to the [1:1] type association, a single device is literally associated with a driver in a one-to-one relationship. A printer whose output destination is an associated device is generated on the client.

Next, according to the [X:1] type association, the same driver is applied to a plurality of devices although each driver is differentiated in output destination. Therefore, a plurality of printers of the same driver that are differentiated in output destination is generated for the client. Further, regarding the [X:1] type association, the driver to be associated may be the Generic driver if the <X> value is a large value.

The Generic driver is a driver that has a structure capable of using the same driver for a plurality of types of devices. Although such a driver may be referred to as "Universal driver" or "common driver," it is referred to as the Generic driver in the present exemplary embodiment.

The Generic driver can be roughly classified into two types. The first type is a driver applicable in a case where the functions to be used are limited to only the basic functions commonly loaded irrespective of device type. The second type is a driver having a function of dynamically switching a user interface by communicating with a device, and having a structure capable of using a device unique function.

The Generic driver having the above-described characteristics can be associated with numerous devices. Therefore, the [X:1] type association having a larger <X> value is generated in an association creation operation.

For the [X:1] type association having a larger <X> value, only an association corresponding to the device selected on the device map is exclusively displayed on an association selection screen in the device map usage PULL mode. On the other hand, in a case where the PUSH mode or the ordinary PULL mode is selected, numerous printers corresponding to the <X> value are generated for the client.

The [1:Y] type association is usable when a single device can use a plurality of drivers. For example, in a case where usage of a combination of a PCL driver and a PS driver and a combination of the PCL driver and an FAX driver are allowed, if the [1:Y] type association is selected, printers that are identical in output destination and different in driver are generated for the client.

The [X:Y] type association is a complex that includes [1:1], [X:1], and [1:Y] type associations. The installation on the client is performed according to the configuration of the complex.

Association selection screens according to the PUSH mode, the ordinary PULL mode, and the device map usage PULL mode applicable to the association example illustrated in FIG. 19 are described below with reference to FIGS. 20A, 20B and 20C.

FIGS. 20A to 20C illustrate examples of the association selection screens according to the first exemplary embodiment. As illustrated in FIG. 20A, the association illustrated in FIG. 19 is directly displayed on the association selection screen in the PUSH mode according to the first exemplary embodiment. As illustrated in FIG. 20B, the association illustrated in FIG. 19 is one-to-one developed and displayed on the association selection screen in the PULL mode according to the first exemplary embodiment. In some cases, the association selection screen in the PULL mode may not be different from the association selection screen in the PUSH mode illustrated in FIG. 20A.

As illustrated in FIG. 20C, the association selection screen in the device map usage PULL mode according to the first exemplary embodiment exclusively displays only the associations that correspond to the device selected on the device map. FIG. 20C illustrates that the device [device 2a] is selected on the device map, If a user selects an arbitrary association on the displayed association selection screen, installation of a driver on the client can be realized. The display pattern of the association selection screens for respective operation modes illustrated in FIGS. 20A to 20C according to the first exemplary embodiment is described below with reference to FIG. 21A.

FIG. 21A illustrates a display pattern list corresponding to operation modes and associations according to the first exemplary embodiment. As illustrated in FIG. 21A, the association selection screen according to the first exemplary embodiment includes portions with display pattern trouble which are indicated by shaded portion. For example, in a case where the operation mode is the "PULL mode", each association is developed into and displayed as [1:1] type associations. Therefore, in a case where the [1:Y] type association is selected as the creation pattern, <Y> pieces of association should be selected. The association selection operation becomes complicated.

Further, in a case where the [X:1] type association is selected as the creation pattern to install printer drivers of many printers, many associations should be selected.

Further, in the case where the [X:Y] type association is selected as the creation pattern, the association selection operation becomes complicated similar to the [1:Y] type association and the [X:1] type association. In the present exemplary embodiment, the association display pattern indicated by the shaded portions in FIG. 21A can be modified into an appropriate association display pattern indicated by shaded portions 2101 and 2102 illustrated in FIG. 21B.

Figure 1:
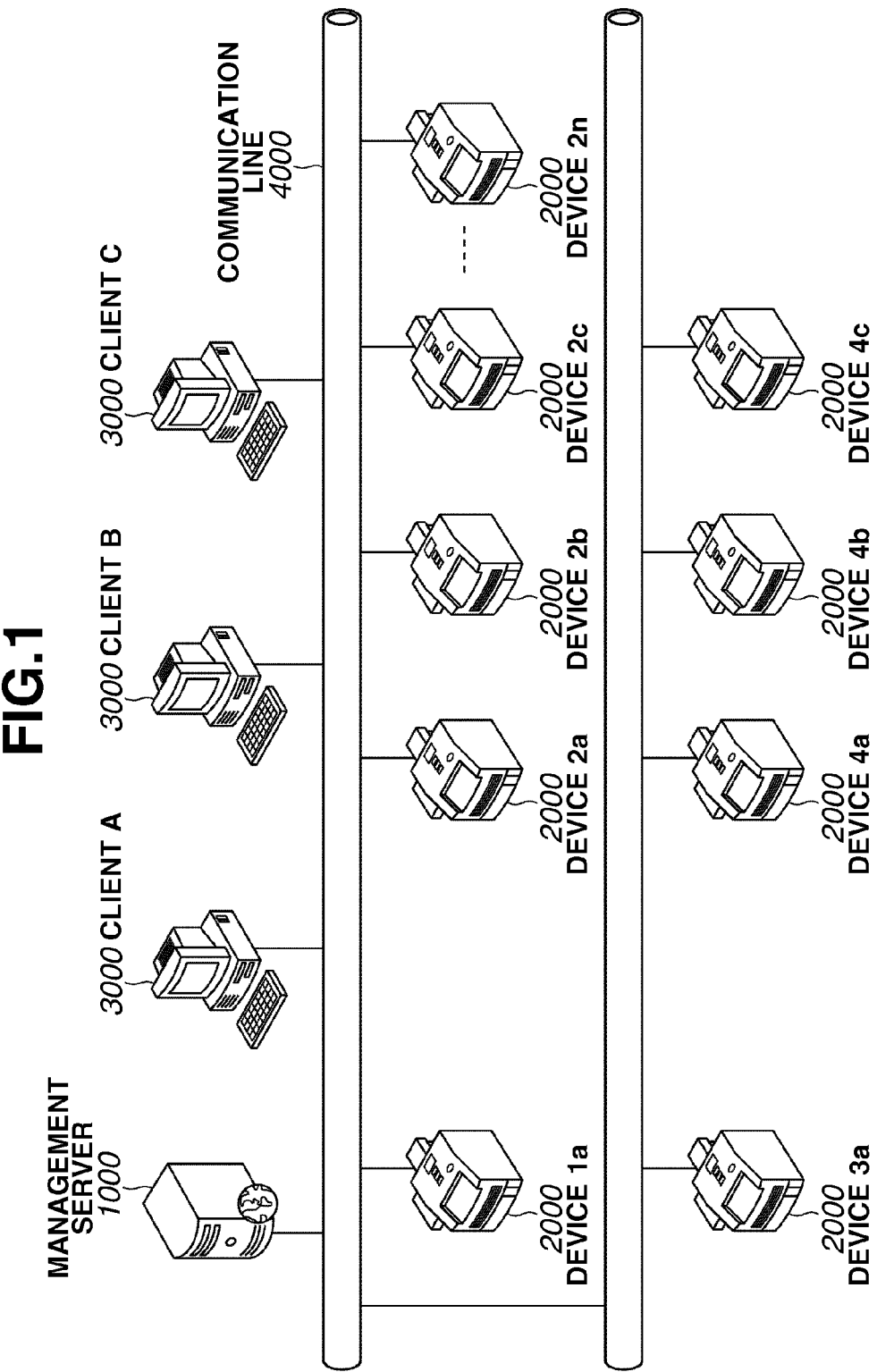
FIG. 1 illustrates a network configuration of a printing system including an information processing apparatus according to an exemplary embodiment of the present invention.

FIG. 1 illustrates a network configuration of a printing system that includes an information processing apparatus according to an exemplary embodiment of the present invention.

The printing system according to a second exemplary embodiment includes a management server 1000, a plurality of devices 2000 (1a, 2a to 2n, 3a, 4a, 4b, and 4c), and a plurality of clients 3000 (A, B, and C). The management server 1000, the device 2000, and the client 3000 are mutually connected via a communication line 4000.

The management server 1000 is a server in which a device management unit 200 (see FIG. 3) is operable to manage the device 2000 and the client 3000. The device management unit 200 has a function of searching the device 2000. As a result of the device search, the device management unit 200 can acquire device information including the device name, a PDL interpretation function loaded on the device, and the IP address of the device. The device search is the search based on a simple network management protocol (SNMP), Internet Protocol (IP) Broadcast, or service location protocol (SLP)/Multicast that are each conventionally known.

Further, the device management unit 200 can acquire and set device information such as Management Information Base (MIB), for the device 2000 via the communication line 4000 such as a local area network (LAN). Further, the device management unit 200 has a function of providing a driver that realizes printing via an application for the client 3000.

The device management unit 200 can be realized as a Web based application. In this case, the client 3000 can use the device management unit 200 via a Web browser.

The device 2000 is a printing apparatus (i.e., an image forming apparatus) having a printing function. The device 2000 can be a printer (single function printer (SFP)) having only a printing function or can be a multifunction peripheral (MFP) having a plurality of functions, such as printing, scanner, copy, facsimile, or the like.

The client 3000 can cause a local printer or a network connected printer to perform printing using an application via a driver. In the present exemplary embodiment, a print operation that uses the local printer indicates a printing system in which print data is directly transmitted from the client 3000 to the device 2000. On the other hand, a print operation that uses the network connected printer indicates a printing system in which print data is transmitted from the client 3000 via a shared printer on a print server that corresponds to the network connected printer.

Next, a hardware configuration of the management server 1000 or the client 3000 is described below with reference to FIG. 2 which illustrates an example of the hardware configuration of the management server 1000 or the client 3000.

Figure 2:
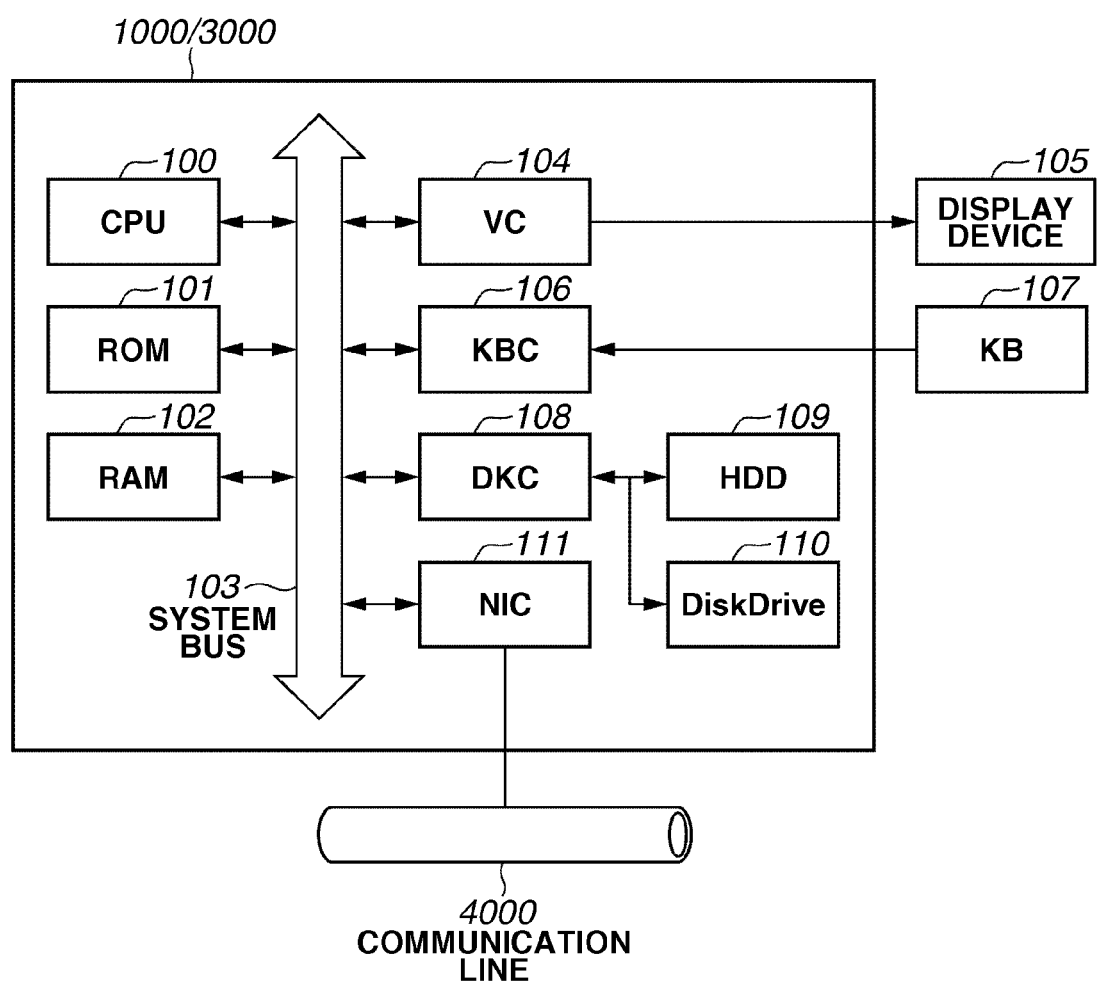
FIG. 2 is a block diagram illustrating an example hardware configuration of a management server or a client according to an exemplary embodiment of the present invention.

In FIG. 2, a central processing unit (CPU) 100 can execute a program loaded into a random access memory (RAM) 102, i.e., a work area, from a read only memory (ROM) 101 or a hard disk drive (HDD) 109 (or a solid state drive (SSD)). Thus, the CPU 100 can control, via a system bus 103, each unit provided in the management server 1000 or the client 3000, so that each function according to the present exemplary embodiment can be realized. A computer readable program that causes a computer to operate as the device management unit 200 (see FIG. 3) is stored in the HDD 109 of the management server 1000.

Further, the above-described program can be provided from an appropriate storage medium, such as a floppy drive (FD), compact disk read only memory (CD-ROM), digital versatile disk (DVD), magnetic tape, or integrated circuit (IC) memory card, which can be mounted on a Disk Drive 110.

The CPU 100 can display a user interface, via a video card (VC) 104, on a display device 105. Further, the CPU 100 can perform a control operation based on an instruction input via a keyboard controller (KBC) 106 from the user interface with a pointing device (KB) 107, such as a keyboard or a mouse. If the display device 105 is a touch panel attached display device, the KBC 106 can be configured to perform a control operation based on a touch panel input.

The CPU 100 can perform data communication via a network interface board (NIC) 111 with the device 2000 or the client 3000 accessible via the communication line 4000.

Figure 3:
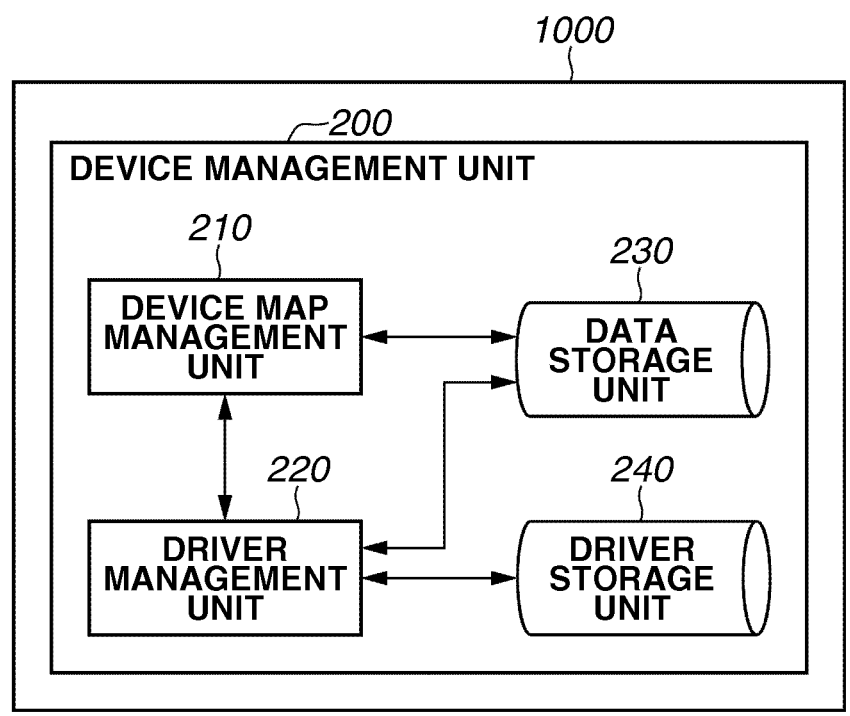
FIG. 3 is a block diagram illustrating an example software configuration of a device management unit operable on the management server.

An example software configuration of the device management unit 200 that can operate on the management server 1000 is described below with reference to FIG. 3. FIG. 3 is a block diagram illustrating an example of the software configuration of the device management unit 200 that can operate on the management server 1000. To realize the device management unit 200, the CPU 100 of the management server 1000 reads a computer readable program stored in the HDD 109 and executes the read program.

As illustrated in FIG. 3, the device management unit 200 includes a device map management unit 210, a driver management unit 220, a data storage unit 230, and a driver storage unit 240.

The device map management unit 210 has a function of locating a device on the network searched by the device management unit 200 on a map to visually express the searched device, and managing the device disposed on the map. The device map management unit 210 can transmit the above-described device layout map (hereinafter, referred to as "device map") to the client 3000 in response to a request from the client 3000, and can cause the client 3000 to display the device map on its display device.

In the present exemplary embodiment, as an auxiliary function for each device managed on the device map, the device map management unit 210 has a function of downloading a driver corresponding to each device and installing the downloaded driver on the client 3000.

For example, if a user selects an arbitrary device on the device map (see FIG. 11) displayed on the display unit of the client 3000 with a mouse and presses a right button of the mouse, a menu "Installation of Driver" is displayed in a sub menu field (an item 1101 illustrated in FIG. 11). If the menu "Installation of Driver" is instructed, a notification is sent from the client 3000 to the device management unit 200. In response to the notification, the device map management unit 210 transmits device information, such as the device name or the IP address that can identify the device selected on the device map to the driver management unit 220 and requests the driver management unit 220 to execute processing to display an association screen related to the device.

The data storage unit 230 is a data recording medium, such as a database that can operate on the HDD 109, which can store device information and driver information. Further, the driver storage unit 240 is operable on the HDD 109. The driver storage unit 240 is a storage area capable of storing the entity of the driver, such as a file transfer protocol (FTP) server, a hypertext transfer protocol (HTTP) server, or a file server.

The data storage unit 230 and the driver storage unit 240 can be a server similar to or different from the management server 1000 described in the present exemplary embodiment.

The driver management unit 220 has a function of executing a driver task, such as addition of a printer or update of a driver, for the client 3000. In other words, this function is a function of installing a driver on the client 3000 according to the PUSH mode from the management server 1000.

Further, in response to a request from the device management unit 200 or the device map management unit 210, the driver management unit 220 can execute processing corresponding to the requested association function. The association function includes a device-driver association creation function, an association management function, and an association display function.

The association creation function is a function of creating a device-driver association. Further, the association management function is a function of editing a created association list. Further, the association display function is a function of transmitting the device-driver association list to the client 3000 and displaying the list on the display device of the client 3000. Then, if a desired association is selected from the association list and installation of the selected association is instructed, the client 3000 sends a notification to the driver management unit 220. In response to the notification, the driver management unit 220 distributes a driver that corresponds to the selected association to the client 3000. The client 3000 creates a logical printer that corresponds to the selected association.

In such a case, a service program that has a driver installation function is usually stationed on the client 3000. The service program can be used to communicate with the driver management unit 220 based on a Web service that uses a Simple Object Access Protocol (SOAP). The driver management unit 220 has the capability of realizing the installation of a driver requested by the client 3000. The capability is a driver installation function according to the PULL mode for installing a driver from the management server 1000, chiefly performed by the client 3000.

For example, the driver installation function according to the PULL mode provides a function of selecting an arbitrary association from the association list and downloading a launcher program that stores the association information to the client. When the client executes the launcher program, the launcher program communicates with the driver management unit 220 using the Web service and acquires a predetermined driver from the driver storage unit 240. The launcher program thus installs the acquired driver on the client.

Accordingly, the driver installation method according to the present exemplary embodiment includes the PUSH mode (first operation mode) chiefly performed by the management server 1000 and the PULL mode (second operation mode) chiefly performed by the client 3000.

Further, the PULL mode includes the device map usage PULL mode according to which associations relating to the device selected on the device map are exclusively displayed, in addition to the ordinary PULL mode according to which an association list is displayed to allow a user to select an arbitrary association. The PUSH mode, the ordinary PULL mode, and the device map usage PULL mode are collectively referred to as operation mode conformation.

Next, an association function of associating a device with a driver to realize installation of a driver that corresponds to an arbitrary device 2000 on the client 3000, which can be executed by the management server 1000, is described. More specifically, an example of control that can be performed by the information processing apparatus according to the present exemplary embodiment is described in detail below with reference to flowcharts illustrated in FIGS. 4, 5, 6, 7, and 8, the associations "association A" to "association D" illustrated in FIG. 19, and the tables and the screens illustrated in FIGS. 10A and 10B, 9A to 9E, 12A and 12B, and 21A and 21B.

In the second exemplary embodiment, it is assumed that the [X:Y] type association, such as the "association E" illustrated in FIG. 19, is not taken into consideration.

FIGS. 4 to 7 are flowcharts illustrating an example of association function processing according to the second exemplary embodiment, which can be executed by the driver management unit 220. More specifically, to realize the processing illustrated in FIGS. 4 to 7, the CPU 100 of the management server 1000 reads a computer readable program stored in the HDD 109 and executes the program.

First, if the driver management unit 220 receives an association function request, then in step S100, the driver management unit 220 analyzes the requested association function.

Next, in step S101, the driver management unit 220 determines whether the requested association function is the association creation function, the association management function, or the association display function. The association management function includes a function of displaying a list of created associations and a function of deleting and/or editing the created association.

[Description of Creation Function]

In step S101, if the driver management unit 220 determines that the requested association function is the association creation function, the processing proceeds to step S102.

Hereinafter, processing corresponding to the association creation function is described below with reference to FIGS. 4 and 5. In step S102 illustrated in FIG. 4, the driver management unit 220 performs association creation mode selection screen display processing. More specifically, the driver management unit 220 generates an association creation mode selection screen illustrated in FIG. 9A as a user interface for creating associations and transmits the generated selection screen to the client 3000 that has requested the above-described association function. The client 3000 receives the association creation mode selection screen and displays the received selection screen on the display device 105.

FIG. 9A illustrates an example of the association creation mode selection screen. As illustrated in FIG. 9A, the association creation mode selection screen includes two radio buttons 901 that are operable to select a desired one of two modes prepared beforehand, that is an "ordinary association creation mode" and a "batch association creation mode". Further, the association creation mode selection screen includes a [Next] button 902 that can be pressed to open a subsequent screen, and a [Cancel] button 903 that can be pressed to stop the presently executed processing. The buttons 901 to 903 are operated by the KB 107 of the client 3000. If the [Next] button 902 or the [Cancel] button 903 is operated, the client 3000 notifies the driver management unit 220 of an operational result.

The "ordinary association creation mode" is a mode suitable in a case where the number of devices or drivers that can be associated with each other is smaller, according to which the created associations are directly registered. On the other hand, the "batch association creation mode" is a mode suitable in a case where the number of devices or drivers that can be associated with each other is larger, according to which the created association is developed and registered in a [1:1] relationship.

The upper limit of the number of devices (i.e., maximum number of devices) and the upper limit of the number of drivers (i.e., maximum number of drivers) that can be associated with each other can be a value set in advance or can be a changeable value, such as an external parameter or a control value that can be set on a user interface.

For example, it is assumed that the maximum number of devices or drivers that can be associated with each other in the "ordinary association creation mode" is "5" and the maximum number of devices or drivers that can be associated with each other in the "batch association creation mode" is "300." In this case, the maximum value with respect to the number of devices or drivers that can be associated with each other in the "ordinary association creation mode" is equal to "5." On the other hand, the maximum value with respect to the number of devices or drivers that can be associated with each other in the "batch association creation mode" is equal to "300."

In the present exemplary embodiment, it is assumed that the [association A], the [association B], and the [association C] illustrated in FIG. 19 are associations generated in the "ordinary association creation mode." Further, it is assumed that the [association D] illustrated in FIG. 19 is an association generated in the "batch association creation mode." Further, the maximum values set for the number of devices and the maximum value set for the number of drivers that can be associated with each other can be differentiated from each other.

Next, in step S103, the driver management unit 220 performs association mode selection processing. More specifically, if the driver management unit 220 receives the operational result from the client 3000 as a user response to the association creation mode selection screen (see FIG. 9A) displayed in step S102, the processing proceeds to step S104.

In step S104, the driver management unit 220 identifies the operational result (i.e., the button action) made on the association creation mode selection screen. Then, if it is determined the [Cancel] button 903 is pressed, the driver management unit 220 terminates the processing in the flowcharts illustrated in FIGS. 4 to 7.

On the other hand, if in step S104 the driver management unit 220 determines that the [Next] button 902 (i.e., the button to be pressed to open a subsequent screen) is pressed, the processing proceeds to step S105.

In step S105, the driver management unit 220 temporarily stores information indicating the association creation mode selected on the association creation mode selection screen (see FIG. 9A) in the data storage unit 230.

Next, in step S106, the driver management unit 220 determines whether the association creation mode selected on the association creation mode selection screen is the "batch association creation mode." Then, if the driver management unit 220 determines that the association creation mode selected on the association creation mode selection screen is the "batch association creation mode" (YES in step S106), the processing proceeds to step S107.

In step S107, the driver management unit 220 accesses the data storage unit 230 to acquire the device information. In the present exemplary embodiment, the device information includes the device name, the loaded PDL interpretation function, and the IP address. Further, the device information acquisition is not limited to the device search performed by the device management unit 200 and may include importing a file (e.g., a comma separated values (CSV) file).

Next, in step S108, the driver management unit 220 performs device selection screen display processing. More specifically, the driver management unit 220 generates a device selection screen illustrated in FIG. 9B as a user interface usable to select devices and transmits the generated selection screen to the client 3000. The client 3000 receives the device selection screen and displays the received screen on the display device 105.

FIG. 9B illustrates an example of the device selection screen. As illustrated in FIG. 9B, the device selection screen includes a device list 911 that enables a user to select a plurality of devices and contains display fields, such as checkbox, device name, PDL, and IP address. Further, the device selection screen includes a [Back] button 912 that can be pressed to reopen the previous association creation mode selection screen (see FIG. 9A), a [Next] button 913 that can be pressed to open a subsequent screen, and a [Cancel] button 914 that can be pressed to stop the presently executed processing. The buttons 911 to 914 are operable via the KB 107 of the client 3000. If the [Back] button 912, the [Next] button 913, or the [Cancel] button 914 is operated, the client 3000 notifies the driver management unit 220 of an operational result.

For example, on the device selection screen, a user of the client 3000 selects the [device 1a] to create the [association A]. Further, the user selects the [device 2a] to create the [association B]. Further, the user selects the [device 2a], the [device 2b], and the [device 2c] to create the [association C]. Further, the user selects the [device 2a] to the [device 2n] in addition to the [device 4a], the [device 4b], and the [device 4b] to create the [association D].

Next, in step S109, the driver management unit 220 performs device selection processing. More specifically, the driver management unit 220 receives the operational result from the client 3000 as a user response to the device selection screen (see FIG. 9B) displayed in step S108. Then, the processing proceeds to step S110.

In step S110, the driver management unit 220 identifies the operational result (i.e., the button action) made on the device selection screen.

If the driver management unit 220 determines that the [Back] button 912 is pressed, the processing proceeds to step S132. In step S132, the driver management unit 220 generates the association creation mode selection screen (see FIG. 9A) including the association creation mode information temporarily stored in the data storage unit 230 in step S105 and transmits the generated selection screen to the client 3000. The processing returns to step S103.

Further, if it is determined that the [Cancel] button 914 is pressed, then in step S130, the driver management unit 220 deletes the data temporarily stored in the data storage unit 230 (i.e., the data stored in step S105). Then, the driver management unit 220 terminates the processing in the flowcharts illustrated in FIGS. 4 to 7.

Further, if the driver management unit 220 determines that the [Next] button 913 is pressed, the processing proceeds to step S111. In step S111, the driver management unit 220 temporarily stores the device information selected from the device selection screen (see FIG. 9B) in the data storage unit 230.

Next, in step S112, the driver management unit 220 performs driver selection screen display processing. More specifically, the driver management unit 220 generates a driver selection screen illustrated in FIG. 9C as a user interface usable to select drivers and transmits the generated selection screen to the client 3000. The client 3000 receives the driver selection screen and displays the received screen on the display device 105.

FIG. 9C illustrates an example of the driver selection screen. As illustrated in FIG. 9C, the driver selection screen includes a driver list 921 that enables a user to select a plurality of drivers and contains display fields, such as checkbox, driver name, version, and PDL. Further, the driver selection screen includes a [Next] button 923 that can be pressed to open a subsequent screen, a [Cancel] button 924 that can be pressed to stop the presently executed processing, and a [Back] button 922 that can be pressed to reopen the previous device selection screen (see FIG. 9B). The buttons 921 to 924 are operable via the KB 107 of the client 3000. If the [Back] button 922, the [Next] button 923, or the [Cancel] button 924 is operated, the client 3000 notifies the driver management unit 220 of an operational result.

For example, a user of the client 3000 selects the [driver A] on the driver selection screen to create the [association A] illustrated in FIG. 19. Further, the user of the client 3000 selects the [driver A], the [driver B], and the [driver C] to create the [association B]. Further, the user of the client 3000 selects the [driver A] to create the [association C]. Further, the user of the client 3000 selects the [driver E] to create the [association D].

Next, in step S113, the driver management unit 220 performs driver selection processing. More specifically, if the driver management unit 220 receives a result of user's operation performed on the driver selection screen (see FIG. 9C) displayed in step S112 from the client 3000, the processing proceeds to step S114.

In step S114, the driver management unit 220 identifies the operational result (i.e., the button action) made on the driver selection screen.

Then, if the driver management unit 220 determines that the [Back] button 922 is pressed, the processing proceeds to step S133. In step S133, the driver management unit 220 generates the device selection screen (see FIG. 9B) including the device information temporarily stored in the data storage unit 230 in step S111 and transmits the generated device selection screen to the client 3000. The processing returns to step S109. The client 3000 receives the above-described device selection screen and displays the received screen on the display device 105.

Further, if it is determined that the [Cancel] button 924 is pressed, then in step S130, the driver management unit 220 deletes the data temporarily stored in the data storage unit 230 (i.e., the data stored in step S105 and step S111). Then, the driver management unit 220 terminates the processing in the flowcharts illustrated in FIGS. 4 to 7.

Further, if the driver management unit 220 determines that the [Next] button 923 is pressed, the processing proceeds to step S115. In step S115, the driver management unit 220 temporarily stores the driver information selected from the driver selection screen in the data storage unit 230.

Next, in step S116, the driver management unit 220 identifies the type of the association with reference to the number of devices selected from the device selection screen illustrated in FIG. 9B and the number of drivers selected from the driver selection screen illustrated in FIG. 9C.

As illustrated in the "association type" field in FIG. 19, the association type according to the present exemplary embodiment is the [1:1] type if the association name is the [association A], the [1:Y] type if the association name is the [association B], the [X:1] type if the association name is the [association C], and the [X:1] type if the association name is the [association D].

In a case where a plurality of devices is selected and only one driver is selected, in step S116, the driver management unit 220 determines that the association type is [X:1] and advances the processing to step S117. In step S117, the driver management unit 220 develops the [X:1] type association into X pieces of [1:1] type association. Then, the processing proceeds to step S120. If the generated association is the [association D], the driver management unit 220 develops the generated association into (n+3) pieces of [1:1] type association.

Further, in a case where only one device is selected and a plurality of drivers is selected, in step S116, the driver management unit 220 determines that the association type is [1:Y]. Then, the processing proceeds to step S118. In step S118, the driver management unit 220 develops the [1:Y] type association into Y pieces of [1:1] type association. Then, the processing proceeds to step S120.

In step S120, the driver management unit 220 performs [1:1] development association information setting screen display processing. More specifically, the driver management unit 220 generates a [1:1] development association information setting screen illustrated in FIG. 9D as a user interface usable to set [1:1] development association information and transmits the generated setting screen to the client 3000. The client 3000 receives the [1:1] development association information setting screen and displays the received screen on the display device 105. In the present exemplary embodiment, the association information to be set includes a device-driver association name, a printer name to be generated on the client, and an output port to be generated on the client.

FIG. 9D illustrates an example of the [1:1] development association information setting screen. As illustrated in FIG. 9D, the [1:1] development association information setting screen includes a [1:1] development association information setting list 931 that enables a user to set the "association name" and the "printer name to be generated" corresponding to a combination of the device selected from the screen illustrated in FIG. 9B and the driver selected from the screen illustrated in FIG. 9C. Further, the [1:1] development association information setting screen includes an alternative association name setting field 935 that enables a user to set "alternative association name."

In the present exemplary embodiment, the "alternative association name" is a provisional name to be displayed in the "association name" field of the association list screen illustrated in illustrated in FIG. 19. If the creation mode is the "batch association creation mode", the driver management unit 220 develops the association into [1:1] type associations in step S117 or step S118. Therefore, in a case where the created association is edited, the "alternative association name" becomes an association name when a developed association is constructed again in the association type. In this case, the editing can be directly performed on the developed association. In the case, it is needless to say that the "alternative association name" is unnecessary. In a case where the "alternative association name" field is blank, it can be processed similarly.

If a user inputs an alternative association name in the alternative association name setting field 935 with the KB 107 of the client 3000, an "association name" field 931*a* of the association information setting list 931 is set based on the input alternative association name. The information in the "association name" field 931*a* is arbitrarily editable with the KB 107 of the client 3000. Further, information in a "printer name to be generated" field 931*b* of the association information setting list 931 is arbitrarily editable with the KB 107 of the client 3000.

The association information setting screen illustrated in FIG. 9D includes a [Back] button 932 that can be pressed to reopen the previous device selection screen (see FIG. 9C), a [Next] button 933 that can be pressed to open a subsequent screen, and a [Cancel] button 934 that can be pressed to stop the presently executed processing. The buttons 931 to 934 are operable via the KB 107 of the client 3000. If the [Back] button 932, the [Next] button 933, or the [Cancel] button 934 is operated, the client 3000 notifies the driver management unit 220 of an operational result.

Hereinafter, example setting for the [1:1] development association information setting screen (see FIG. 9D) is described below. For example, in the creation of [association D], as illustrated in FIG. 9D, a user sets on the client 3000, [association D_1] in the "association name" field 931*a* for the [device 2a] and sets [Room2_color_MFP_No. 1] in the "printer name to be generated" field 931*b*. Similarly, as illustrated in FIG. 9D, the user sets, on the client 3000, an association name in the field 931*a* and a printer name to be generated in the field 931*b* for each of the [device 2b] to the [device 2n]. Further, the user sets, on the client 3000, an association name in the field 931*a* and a printer name to be generated in the field 931*b* for each of the [device 4a], the [device 4b], and the [device 4c]. Further, the user sets the [association D] in the "alternative association name" field 935 on the client 3000.

Figure 5:
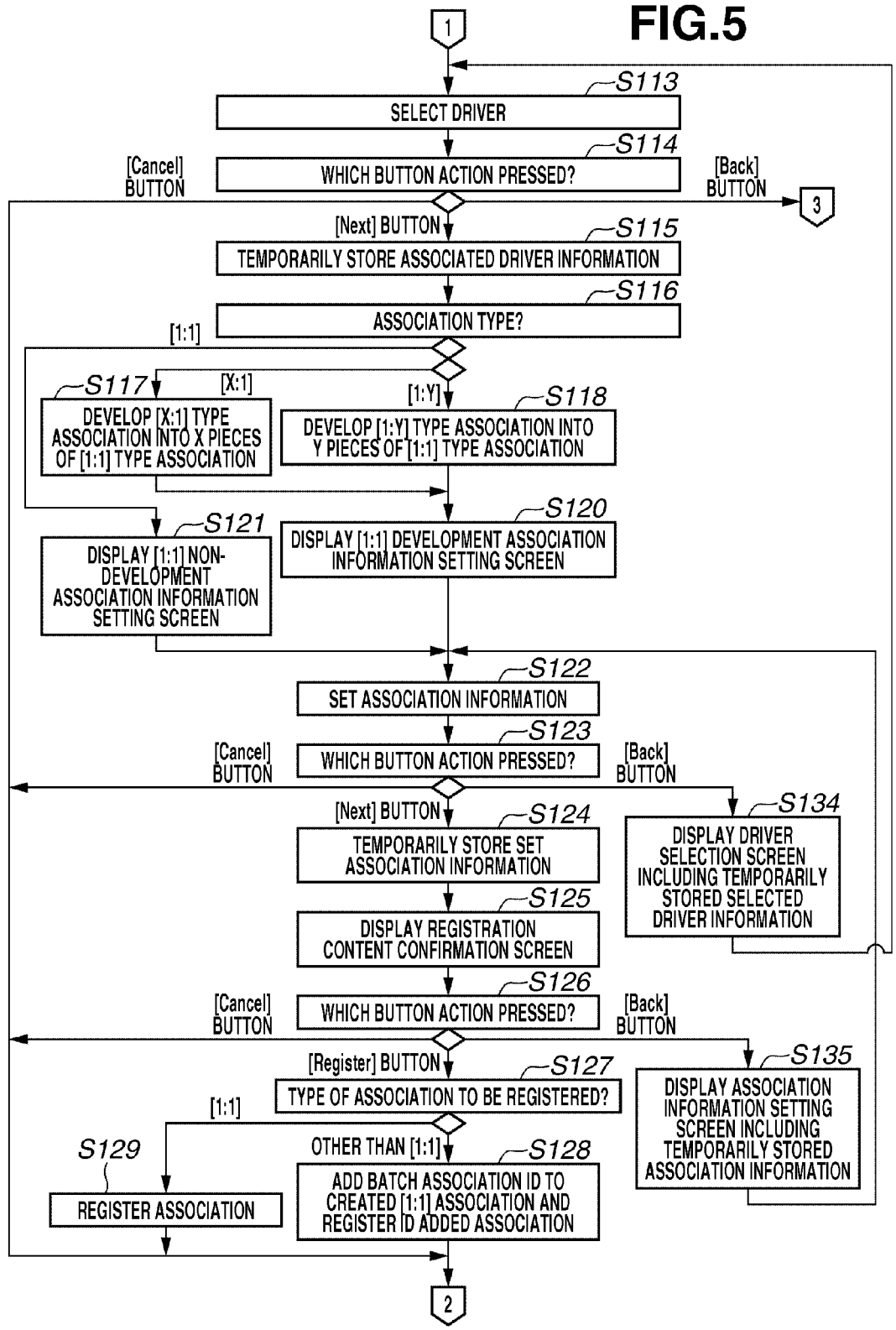
FIG. 5 is a flowchart illustrating an example of the association function processing according to the second exemplary embodiment of the present invention.

Referring back to the flowchart illustrated in FIG. 5, in step S116, if the association type is [1:1], then in step S121, the driver management unit 220 performs [1:1] non-development association information setting screen display processing. More specifically, the driver management unit 220 generates a [1:1] non-development association information setting screen (not illustrated) as a user interface usable to set [1:1] non-development association information. The driver management unit 220 transmits the generated setting screen to the client 3000. The client 3000 receives the [1:1] non-development association information setting screen and displays the received screen on the display device 105. In a case where only one device is selected and only one driver is selected, the driver management unit 220 determines that the association type is [1:1].

The [1:1] non-development association information setting screen is a user interface different from the [1:1] development association information setting screen illustrated in FIG. 9D in that the column of the [1:1] developed "association name" is removed and the "alternative association name" is replaced by "association name." The [1:1] non-development association information setting screen (not illustrated) enables a user to set an association name and a printer name to be generated. Further, similar to the screen illustrated in FIG. 9D, the [1:1] non-development association information setting screen includes the [Next] button 933 that can be pressed to open a subsequent screen, the [Cancel] button 934 that can be pressed to stop the presently executed processing, and the [Back] button 932 that can be pressed to reopen the previous device selection screen (see FIG. 9C). The [1:1] non-development association information setting screen is operable with the KB 107 of the client 3000. Further, if the [Back] button 932, the [Next] button 933, or the [Cancel] button 934 is operated, the client 3000 notifies the driver management unit 220 of an operational result.

Next, in step S122, the driver management unit 220 performs association information setting processing. More specifically, the driver management unit 220 receives the operational result from the client 3000 as a user response to the association information setting screen displayed in step S120 or step S121. Then, the processing proceeds to step S110.

In step S123, the driver management unit 220 identifies the operational result (i.e., the button action) made on the association information setting screen.

If the driver management unit 220 determines that the [Back] button 932 is pressed, the processing proceeds to step S134. In step S134, the driver management unit 220 generates the driver selection screen (see FIG. 9C) that includes the associated driver information temporarily stored in the data storage unit 230 in step S115, and transmits the generated selection screen to the client 3000. Then, the processing returns to step S113. The client 3000 receives the above-described driver selection screen and displays the received screen on the display device 105.

Further, if the driver management unit 220 determines that the [Cancel] button 924 is pressed, then in step S130, the driver management unit 220 deletes the data temporarily stored in the data storage unit 230 (i.e., the data stored in step S105, step S111, and step S115). Then, the driver management unit 220 terminates the processing in the flowcharts illustrated in FIGS. 4 to 7.

Further, if the driver management unit 220 determines that the [Next] button 933 is pressed, the processing proceeds to step S124. In step S124, the driver management unit 220 temporarily stores the association information set on the association information setting screen in the data storage unit 230.

Next, in step S125, the driver management unit 220 performs registration content confirmation screen display processing. More specifically, the driver management unit 220 generates a registration content confirmation screen as illustrated in FIG. 9E and transmits the generated confirmation screen to the client 3000. The client 3000 receives the registration content confirmation screen and displays the received screen on the display device 105.

FIG. 9E illustrates an example of the registration content confirmation screen. As illustrated in FIG. 9E, the registration content confirmation screen includes an association information display field 941 that enables a user to confirm the association information set on the setting screen illustrated in FIG.

9D. Further, as illustrated in FIG. 9E, the registration content confirmation screen includes a [Back] button 942 that can be pressed to reopen the previous association information setting screen illustrated in FIG. 9D, a "Register" button 943 that can be pressed to register association information, and a [Cancel] button 944 that can be pressed to stop the presently executed processing. The buttons 942 to 944 are operable via the KB 107 of the client 3000. If the [Back] button 942, the "Register" button 943, or the [Cancel] button 944 is operated, the client 3000 notifies the driver management unit 220 of an operational result.

If the driver management unit 220 receives the operational result from the client 3000 as a user response to the registration content confirmation screen (see FIG. 9E) displayed in the above-described display processing, the processing proceeds to step S126.

In step S126, the driver management unit 220 identifies the operational result (i.e., the button action) made on the registration content confirmation screen.

Then, if the driver management unit 220 determines that the [Back] button 942 is pressed, the processing proceeds to step S135. In step S135, the driver management unit 220 generates the association information setting screen including the association information temporarily stored in the data storage unit 230 in step S124 and transmits the generated setting screen to the client 3000. Then, the processing returns to step S122. The client 3000 receives the above-described association information setting screen and displays the received screen on the display device 105.

Further, if the driver management unit 220 determines that the [Cancel] button 944 is pressed, then in step S130, the driver management unit 220 deletes the data temporarily stored in the data storage unit 230 (i.e., the data stored in step S105, step S111, step S115, and step S124). Then, the driver management unit 220 terminates the processing in the flowcharts illustrated in FIGS. 4 to 7.

Further, if the driver management unit 220 determines that the [Register] button 943 (i.e., the button that can be pressed to register association information), the processing proceeds to step S127. In step S127, the driver management unit 220 determines whether the type of the association to be registered is the [1:1] type association or not. More specifically, the driver management unit 220 determines whether the type of the association identified in step S116 is the [1:1] type association or other than the [1:1] type association.

If the driver management unit 220 determines that the type of the association is other than the [1:1] type association, then the processing proceeds to step S128. In step S128, the driver management unit 220 performs processing for adding a batch association identifier (ID) corresponding to the "alternative association name" to the association and registering the batch association ID attached association to the data storage unit 230.

On the other hand, in step S127, if the driver management unit 220 determines that the association type is [1:1], the processing proceeds to step S129. In step S129, the driver management unit 220 performs processing for registering the association that is not accompanied by the "batch association ID" to the data storage unit 230.

FIGS. 10A and 10B illustrate example tables usable to register the association information.

The table illustrated in FIG. 10A includes fields of batch association ID and [1:1] developed association information (i.e., association name, device name, IP address, printer name to be generated, driver name, PDL, and version).

The table illustrated in FIG. 10B includes fields of batch association ID and alternative association name included in the association information. The tables illustrated in FIGS. 10A and 10B have a relational table relationship based on the "batch association ID."

In a case where the type of the association is other than [1:1] (more specifically, in the registration processing in step S128), the driver management unit 220 registers the association information in the data storage unit 230 by adding a predetermined value (e.g., "1") to a batch association ID field of the [1:1] developed association information (i.e., association name, device name, IP address, printer name to be generated, driver name, PDL, and version). Further, the driver management unit 220 registers an alternative association name (e.g., "association D") included in the association information of the "alternative association name" that corresponds to ID registered in the batch association ID field. More specifically, with respect to the association information developed from the association information of "1", the driver management unit 220 adds identification information (i.e., batch association ID) to associate each of the association information developed from association information of "1 and stores the batch association ID added association information in the data storage unit 230.

On the other hand, in a case where the type of the association is [1:1] (more specifically, in the registration processing in step S129), the driver management unit 220 registers the [1:1] type association information (i.e., association name, device name, IP address, printer name to be generated, driver name, PDL, and version) when it registers the association information in the data storage unit 230. In this case, no value is registered in the batch association ID field.

If the registration processing in step S128 or step S129 is completed, then in step S130, the driver management unit 220 deletes the data temporarily stored in the data storage unit 230 (i.e., the data temporarily stored in step S105, step S111, step S115, and step S124). Then, the driver management unit 220 terminates the processing in the flowcharts illustrated in FIGS. 4 to 7.

In step S106, if the driver management unit 220 determines that the association creation mode selected on the association creation mode selection screen (see FIG. 9A) is the "ordinary association creation mode" (NO in step S106), then in step S131, the driver management unit 220 performs ordinary association creation processing. In the present exemplary embodiment, the "ordinary association processing" to be performed in step S131 does not include the processing performed in step S116 to step S120, step S127, and step S128 in the "batch association creation mode."

As described above, if the association information does not have a one-to-one relationship with respect to the device-driver association when it is generated in a state where the batch association creation mode (i.e., second creation mode) is set, the driver management unit 220 develops the association information into association information having the one-to-one relationship with respect to the device-driver association. The developed association information is stored in the data storage unit 230. On the other hand, the driver management unit 220 directly stores the association information created in a state where the ordinary association creation mode (i.e., first creation mode) is set into the data storage unit 230, without performing the development. Thus, the "association A", the "association B", the "association C", and the "association D" are generated as illustrated in FIG. 19.

[Description of Management Function]

Figure 4:
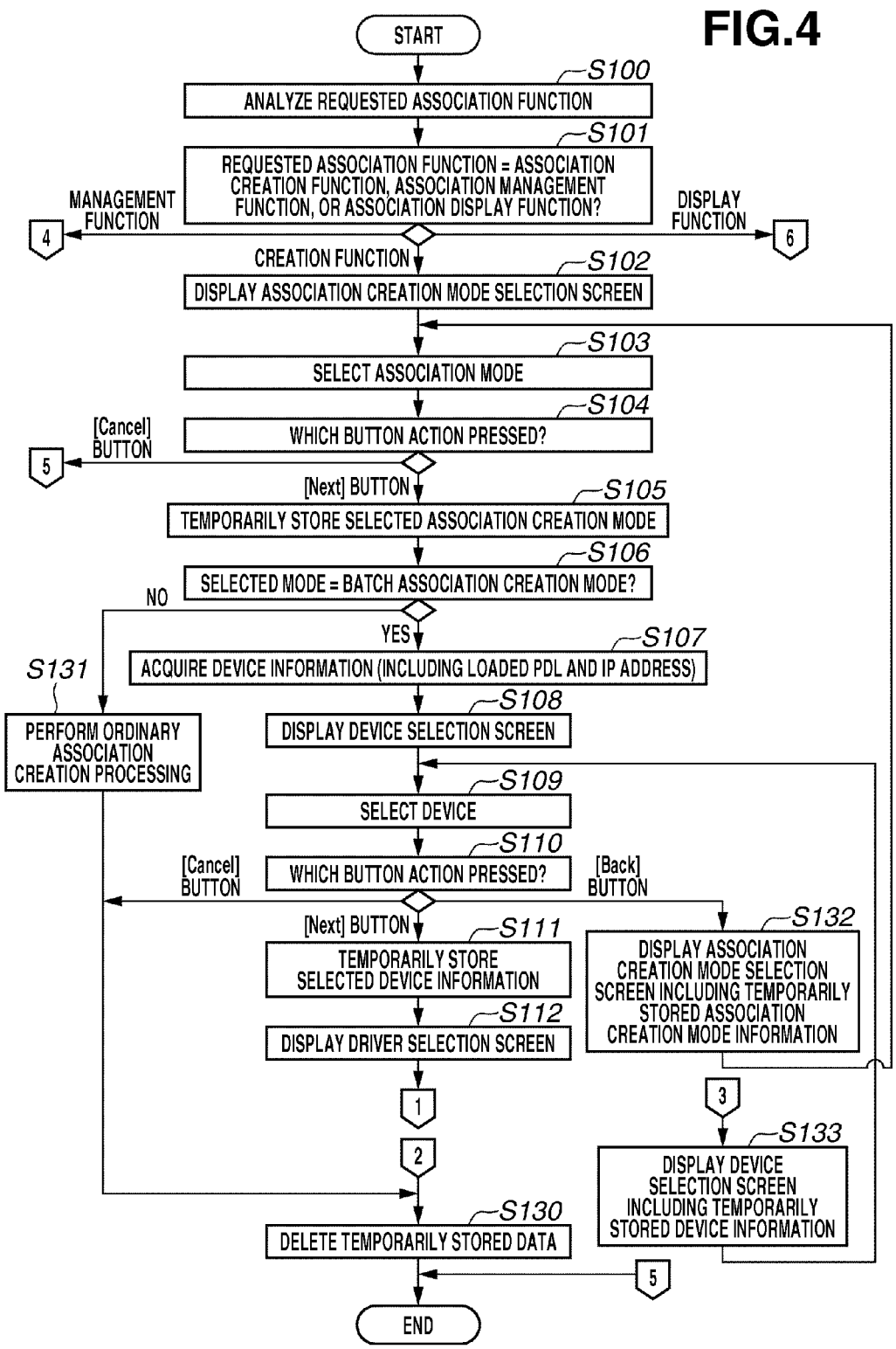
FIG. 4 is a flowchart illustrating an example of association function processing according to a second exemplary embodiment of the present invention.
Figure 6:
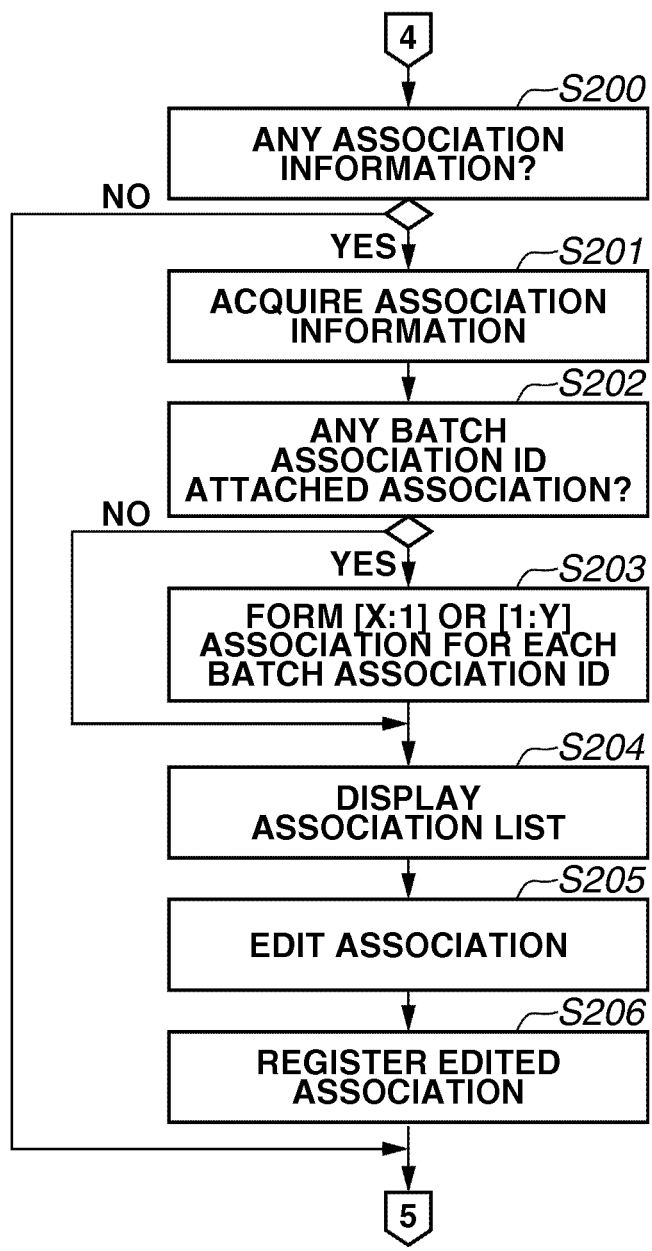
FIG. 6 is a flowchart illustrating an example of the association function processing according to the second exemplary embodiment of the present invention.

In step S101 illustrated in FIG. 4, if the driver management unit 220 determines that the association management function is requested, the processing proceeds to step S200 illustrated in FIG. 6. For example, the request of the association management function can be performed in the following manner. If the CPU 100 of the client 3000 detects that a user has instructed executing the association management function with the KB 107 via the screen (not illustrated) displayed on the display device 105 of the client 3000, the CPU 100 of the client 3000 transmits an association management screen transition request to the device management unit 200. In response to the association management screen transition request, the device management unit 200 transmits an association management function request to the driver management unit 220.

Based on the association management function request, the driver management unit 220 determines that the association management function is requested. Thus, the processing proceeds to step S200 illustrated in FIG. 6.

Hereinafter, processing that corresponds to the association management function is described below with reference to FIG. 6. First, in step S200, the driver management unit 220 determines whether there is any association information in the data storage unit 230.

If it is determined that the association information is not present in the data storage unit 230 (NO in step S200), the driver management unit 220 terminates the processing in the flowcharts illustrated in FIGS. 4 to 7. On the other hand, if the driver management unit 220 determines that the association information is present in the data storage unit 230 (YES in step S200), the processing proceeds to step S201.

In step S201, the driver management unit 220 acquires the association information [association A] to [association D] illustrated in FIG. 19 from the data storage unit 230. The information acquired in this step corresponds to the information registered in step S128, S129, or S131 illustrated in FIG. 5 (more specifically, the information stored in the table illustrated in FIG. 10).

Next, in step S202, the driver management unit 220 determines whether a batch association ID added association is present.

If the driver management unit 220 determines that the batch association ID added association is present (YES in step S202), the processing proceeds to step S203. For example, as illustrated in FIGS. 10A and 10B, in the case where "1" is added to the batch association ID and corresponding data is present in the alternative association name "association D", the driver management unit 220 determines that the batch association ID added association is present.

In step S203, the driver management unit 220 forms an [X:1] or [1:Y] type association for each batch association ID. Then, the processing proceeds to step S204. For example, according to the association information illustrated in FIGS. 10A and 10B, the driver management unit 220 forms the "association D" having alternative association name "association D" illustrated in FIG. 19 based on the associations having association names "association D_1" to "association D_(n+3)" respectively. More specifically, the driver management unit 220 brings the identification information into an associated state with respect to each piece of the association information to which identification information (batch association ID) is added.

On the other hand, if the driver management unit 220 determines that the batch association ID added association is not present (NO in step S202), the processing directly proceeds to step S204.

Next, in step S204, the driver management unit 220 generates an association list based on the acquired associations, or associations formed based on the batch association ID. Then, the driver management unit 220 transmits the generated association list to the client 3000 that has requested the above-described association function.

The client 3000 receives the above-described association list and displays the received list on the display device 105. For example, as illustrated in FIG. 19, an association list including the "association D" formed in step S203 and the "association A", the "association B", and the "association C" to which no batch association ID is added. The association list to be displayed on the display device 105 of the client 3000 is selectable and editable via the KB 107 of the client 3000. If a selection and editing operation is performed on the client 3000 and an operation to apply an edited result is performed via the KB 107, the edited result is notified from the client 3000 to the driver management unit 220.

Next, in step S205, the driver management unit 220 performs association editing processing. More specifically, the driver management unit 220 receives the edited result relating to the association list displayed in step S204 from the client 3000. Subsequently, the processing proceeds to step S206.

In step S206, the driver management unit 220 updates the association information registered in the data storage unit 230 based on the edited result relating to the association list received from the client 3000. More specifically, the driver management unit 220 stores edited result reflecting the association information in the table illustrated in FIG. 10. Then, the driver management unit 220 terminates the processing in the flowcharts illustrated in FIGS. 4 to 7.

[Description of Display Function]

Figure 7:
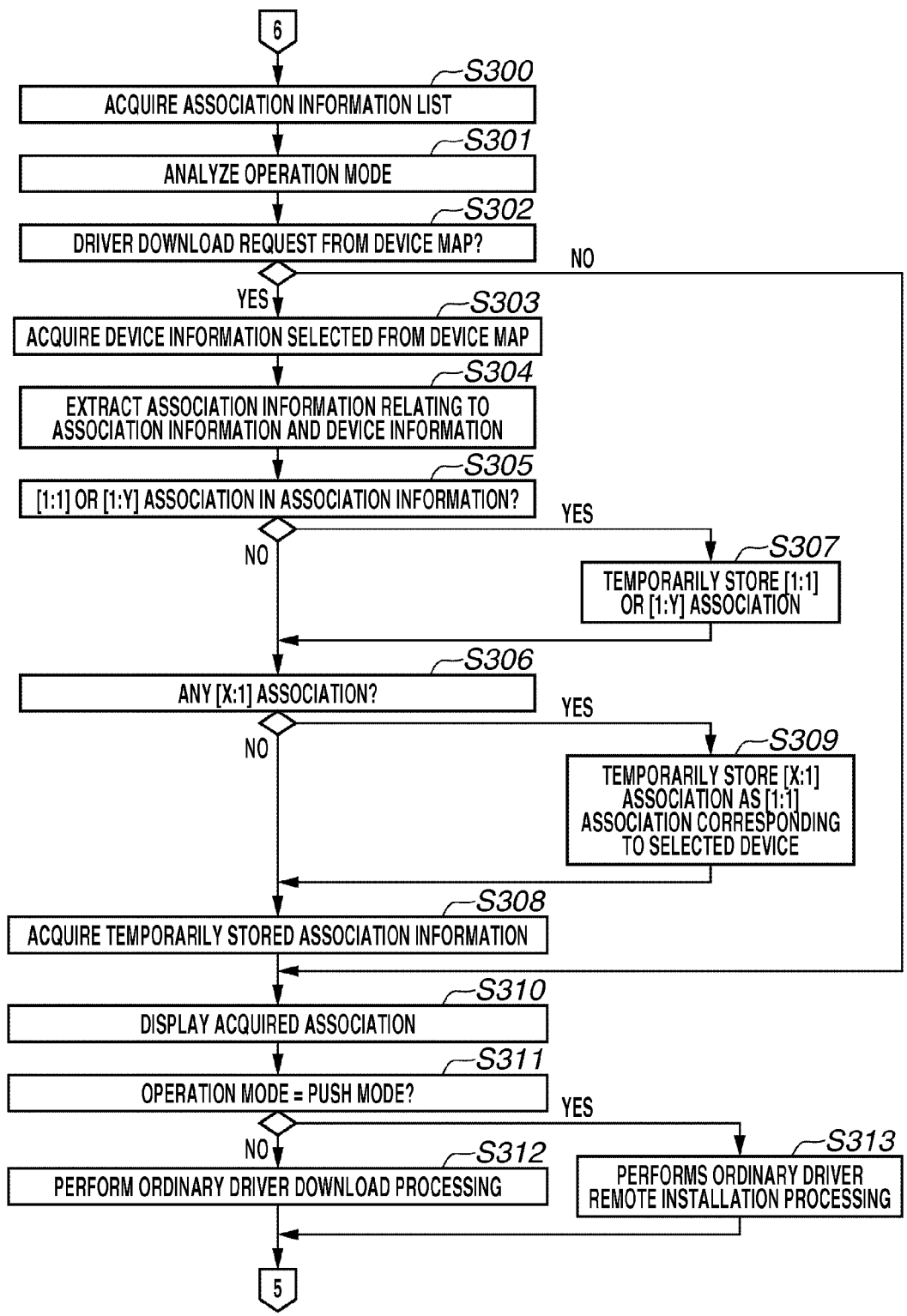
FIG. 7 is a flowchart illustrating an example of the association function processing according to the second exemplary embodiment of the present invention.

In step S101 illustrated in FIG. 4, if the driver management unit 220 determines that the association display function is requested, the processing proceeds to step S300 illustrated in FIG. 7. For example, the driver management unit 220 determines that the association display function is requested, (1) when the PUSH mode is executed by the device management unit 200, (2) when executing the ordinary PULL mode is instructed by the client 3000, (3) when executing the device map usage PULL mode is instructed by the client 3000.

Hereinafter, the device map usage PULL mode is described with reference to the flowchart illustrated in FIG. 8, which illustrates an example of device map usage PULL mode request processing. To realize the processing in the flowchart illustrated in FIG. 8, the CPU 100 of the client 3000 reads a computer readable program from the HDD 109 and executes the readout program.

First, in step S400, the CPU 100 of the client 3000 detects an arbitrary device selected via the KB 107 on the device map (see FIG. 11) displayed on the display device 105 of the client 3000. In step S401, the CPU 100 of the client 3000 detects that a function of downloading a driver that corresponds to the selected device is selected with the KB 107 as in the menu 1101 illustrated in FIG. 11. Then, the processing proceeds to step S402. For example, it is assumed that the device name [device 2a] is selected on the device map illustrated in FIG. 19.

FIG. 11 illustrates an example of the device map. As illustrated in FIG. 11, the device map is a map image on which an icon indicating the installation position of each device is arranged. The device map enables a user to select the icon on the map image and request a list of association information including the device that corresponds to the selected icon (see the menu 1101 illustrated in FIG. 11). The device map can be generated by the device map management unit 210 and transmitted to the client 3000 (referred to as map image transmission processing), and can be displayed on the display device 105 of the client 3000.

Subsequently, in step S402, the CPU 100 of the client 3000 transmits a transition request to the device map management unit 210, which causes the driver management unit 220 to transmit a driver download screen accompanied by the selected device information, more specifically, an association selection screen that corresponds to the selected device information. In the present exemplary embodiment, the device information is information capable of identifying the device name (e.g., [device 2a]) of the above-described selected device. If the device map management unit 210 receives the transition request to open the association selection screen that corresponds to the above-described selected device information, the device map management unit 210 requests the driver management unit 220 to provide the association display function of the device map usage PULL mode that corresponds to the above-described selected device information.

In the case of the ordinary PULL mode, the CPU 100 of the client 3000 detects that a user has instructed executing the driver download function with the KB 107 on a screen (not illustrated) displayed on the display device 105 of the client 3000. Then, the CPU 100 of the client 3000 transmits a driver download screen, more specifically, a transition request to open an association selection screen of the ordinary PULL mode, to the device management unit 200. If the device management unit 200 receives the transition request to open the association selection screen of the ordinary PULL mode, the device management unit 200 requests the driver management unit 220 to provide the association display function of the ordinary PULL mode.

Further, in the case of the PUSH mode, the CPU 100 of the client 3000 operated by an administrator detects execution of a driver remote installation function is instructed with the KB 107 on a screen (not illustrated) displayed on the display device 105 of the client 3000. Then, the CPU 100 of the client 3000 transmits a transition request to a driver remote installation screen, more specifically, an association selection screen in the PUSH mode, to the device management unit 200. If the device management unit 200 receives the transition request to the association selection screen in the PUSH mode, the device management unit 200 requests the driver management unit 220 to provide the association display function of the PUSH mode.

Based on the above-described association display function request, the driver management unit 220 determines that the association display function is requested. Then, the processing proceeds to step S300 illustrated in FIG. 7.

Hereinafter, processing that corresponds to the association display function is described below with reference to the flowchart illustrated in FIG. 7. First, in step S300, the driver management unit 220 acquires the association information list, such as the information [association A] to [association D] illustrated in FIG. 19, from the data storage unit 230. The information acquired in this step corresponds to the information registered in step S128, S129, or S131 illustrated in FIG. 5 (more specifically, the information stored in the table illustrated in FIG. 10).

Next, in step S301, the driver management unit 220 performs operation mode analysis processing to identify the operation mode that has requested the display of the association selection screen.

Next, in step S302, the driver management unit 220 determines whether the operation mode is a request from the device map (more specifically, the device map management unit 210), based on a result of the operation mode analysis.

If the driver management unit 220 determines that the operation mode is the request from the device map (YES in step S302), the processing proceeds to step S303. In step S330, the driver management unit 220 identifies a device selected on the device map based on the device information transmitted from the device map management unit 210 together with the request to the association display function.

Next, in step S304, the driver management unit 220 extracts the association information relating to the selected device, with reference to the association information acquired in step S300 as well as the device information identified in step S303. For example, if the selected device is [device 2a], the driver management unit 220 extracts the association information that corresponds to the [association B], the [association C], and [association D] illustrated in FIG. 19. In the present exemplary embodiment, the "association D" is generated in the "batch association creation mode" and stored in a [1:1] developed state, i.e., "association D_1" to "association D_(N+3)", as illustrated in FIGS. 10A and 10B.

Next, in step S305, the driver management unit 220 determines whether the [1:1] or [1:Y] type association is present in the association information extracted in step S304. If the driver management unit 220 determines that the [1:1] or [1:Y] type association is present (YES in step S305), the processing proceeds to step S307.

In step S307, the driver management unit 220 temporarily stores the [1:1] or [1:Y] type association in the data storage unit 230. Then, the processing proceeds to step S306. For example, the [1:Y] type association [association B] illustrated in FIG. 19 and the association name "association D_1" of the [1:1] developed alternative association name "association D" are temporarily stored.

On the other hand, if the driver management unit 220 determines that there is neither the [1:1] type association nor the [1:Y] type association (NO in step S305), the processing directly proceeds to step S306. In step S306, the driver management unit 220 determines whether the [X:1] type association is present.

If the driver management unit 220 determines that the [X:1] type association is present (YES in step S306), the processing proceeds to step S309.

In step S309, the driver management unit 220 develops the [X:1] type association into [1:1] type associations that correspond to the selected driver and temporarily stores the developed [1:1] type associations in the data storage unit 230. Then, the processing proceeds to step S308. For example, the development of the [X:1] type association into the [1:1] type associations is performed in such a way that only the association relating to the device name [device 2a] of the association name [association C] (i.e., the [X:1] type association) illustrated in FIG. 19 is extracted and developed into the [1:1] type association and then temporary stored. More specifically, the association name [association C] is developed into the [1:1] type association that associates the device name [device 2a] with the driver name [driver A] and is temporary stored.

On the other hand, if the driver management unit 220 determines that the [X:1] type association is not present (NO in step S306), the processing directly proceeds to step S308. In step S308, the driver management unit 220 acquires the association information temporarily stored in step S307 or in step S309. Then, the processing proceeds to step S310.

Further, if the driver management unit 220 determines that the operation mode is not the request from the device map (NO in step S302), the processing directly proceeds to step S310.

Next, in step S310, the driver management unit 220 displays the association acquired in step S308. More specifically, the driver management unit 220 generates an association selection screen illustrated in FIG. 12 as a user interface for selecting associations and transmits the generated selection screen to the client 3000. The client 3000 receives the association selection screen and displays the received screen on the display device 105. In the present exemplary embodiment, the client 3000 corresponds to the client that has requested the association display function.

FIGS. 12A and 12B illustrate example association selection screens. If the download of a driver from the device map is not requested, then in step S310, the association list acquired in step S300 is directly displayed, for example, as illustrated in FIG. 12A.

On the other hand, if the download of the driver from the device map is requested, then in step S310, the association list acquired in step S308 is displayed. For example, as illustrated in FIG. 12B, associations relating to the device having the selected device name [device 2a] are displayed. The [association B] with the [1:Y] type association and the [association D_1] with the [1:1] type association are directly displayed. Further, the [association C] with the [X:1] type association is developed into and displayed as [1:1] type associations.

The association list (see FIGS. 12A and 12B) is operable via the KB 107 of the client 3000. A user of the client 3000 checks a checkbox of an association including a driver to be installed on the association list (see FIG. 12), and performs a predetermined operation (e.g., clicks a download button (not illustrated) with the KB 107) to transmit a notification including an operation content from the client 3000 to the driver management unit 220. If the driver management unit 220 receives the notification, the processing proceeds to step S311.

In step S311, the driver management unit 220 determines whether the operation mode is the PUSH mode.

If the driver management unit 220 determines that the operation mode is not the PUSH mode (i.e., the operation mode is the PULL mode) (NO in step S311), the processing proceeds to step S312. In step S312, the driver management unit 220 performs ordinary driver download processing. More specifically, the driver management unit 220 executes a task to transmit a driver that corresponds to the association checked via the checkbox of the above-described association list (see FIG. 12) to the client 3000 that has requested the association display function and to cause the client 3000 to install the driver.

On the other hand, if the driver management unit 220 determines that the operation mode is the PUSH mode (YES in step S311), the processing proceeds to step S313. In step S313, the driver management unit 220 performs ordinary driver remote installation processing. More specifically, for all clients 3000 that are managed by the device management unit 200, the device management unit 200 executes a task to transmit the driver that corresponds to each association checked via the checkbox of the above-described association list (see FIG. 12) and cause each client 3000 to install the received driver.

As described above, when the operation mode is the PUSH mode, the device management unit 200 performs driver transmission and installation processing for all of the managed clients 3000. However, it is also useful to transmit a driver to a specific client 3000 selected when the association display function is requested so that the driver can be installed on the specific client 3000. Further, it is also useful to set an installation time to transmit a driver to the client 3000 when the installation time comes so that the driver can be installed at scheduled timing.

Then, if the above-described processing in step S312 or step S313 has been completed, the driver management unit 220 terminates the processing in the flowcharts illustrated in FIGS. 4 to 7.

FIG. 21B illustrates a relationship between association conformations and operation mode conformations, as a result of the processing that corresponds to the association display function (e.g., FIG. 7). The association display pattern indicated by the shaded portion illustrated in FIG. 21A can be modified into an appropriate association display pattern indicated by shaded portions 2101 and 2102 illustrated in FIG. 21B.

More specifically, in the first exemplary embodiment, the association selection screen is displayed as illustrated in FIG. 20A if the operation mode is the PUSH mode, as illustrated in FIG. 20B if the operation mode is the ordinary PULL mode, and as illustrated in FIG. 20C if the operation mode is the device map usage PULL mode. According to the second exemplary embodiment, these association selection screens are improved as follows. The association selection screen is displayed as illustrated in FIG. 12A if the operation mode is the PUSH mode or the ordinary PULL mode, and as illustrated in FIG. 12B if the operation mode is the device map usage PULL mode.

For example, in a case where the [1:Y] type association (e.g., the association B) is created beforehand by an administrator according to the "ordinary association creation mode", the improved association selection screen according to the present exemplary embodiment enables a user to select the [1:Y] type association (e.g., the association B) collectively without requiring a troublesome operation for selecting <Y> pieces of association.

Further, in a case where the [X:1] type association including a large number of devices, such as the association D, is created beforehand by an administrator according to the "batch association creation mode" (for example, when numerous devices of the same model are purchased), the [X:1] type association including a large number of devices, such as the association D, is developed in [1:1] type associations without being displayed directly. Therefore, it can prevent <X> pieces of printer (logical printer) from being generated for the client. Further, the administrator is not required to create <X> pieces of [1:1] type associations independently. Thus, it can improve the efficiency in the association creation.

As described above, according to the present exemplary embodiment, with respect to the association between a device serving as a unit of selection when a driver is installed on the client 3000 and the driver, the batch association creation mode is provided and the [X:1] type association including a large number of devices can be developed into [1:1] type associations. Thus, it is feasible to prevent a large number of (X pieces of) logical printers from being uselessly generated for the client, for example, when a user erroneously selects the [X:1] type association (including a large number of devices) via the client 3000 using the ordinary PULL mode. Each user can select a desired device using the device map usage PULL mode and can install a driver suitable for the selected device on each client 3000.

As described above, according to the present exemplary embodiment, a user interface that enables a user to perform appropriate association display/selection can be provided with reference to the operation mode conformation and the association conformation for the driver installation, in the device-driver association selection.

Further, in the association management according to the present exemplary embodiment, a user interface can be provided that enables a user to perform editing without changing the conformation having been selected in the creation (e.g., [1:1], [1:Y], [X:1]). Thus, the user can easily perform editing even when the association type is [X:1] that includes a large number of devices that have been developed into [1:1] type associations.

As described above, according to the present exemplary embodiment, the simplification of the selection processing and appropriate installation can be realized. As a result, the operability of the IT administrator can be improved and management costs of a computer system can be reduced.

Further, according to the present exemplary embodiment, the ordinary association creation mode is provided to create and directly display a [1:Y] type association that includes a large number of drivers to be associated. Thus, for example, the user can select [1:Y] type associations collectively and efficiently, compared to the case where <Y> pieces of associations are selected successively.

A third exemplary embodiment is characterized in that an association that corresponds to the [X:Y] type association illustrated in the association name [association E] illustrated in FIG. 19 is usable. Hereinafter, characteristic features of the third exemplary embodiment are described below which is different from those of the second exemplary embodiment.

[Description of Creation Function]

FIG. 13 illustrates an example of the driver selection screen according to the third exemplary embodiment. The driver selection screen illustrated in FIG. 13 is different from the screen illustrated in FIG. 9C in that an additional button 925 is provided. Elements identical to those illustrated in FIG. 9C are denoted by the same reference numerals.

As illustrated in FIG. 13, the driver selection screen according to the third exemplary embodiment includes the [X:Y] button 925 that enables a user to select a plurality of device-driver combinations to create an [X:Y] type association. The buttons 921 to 925 are operable via the KB 107 of the client 3000. If the [Back] button 922, the [Next] button 923, the [Cancel] button 924, or the [X:Y] button 925 is operated, the client 3000 notifies the driver management unit 220 of an operational result.

Figure 14:
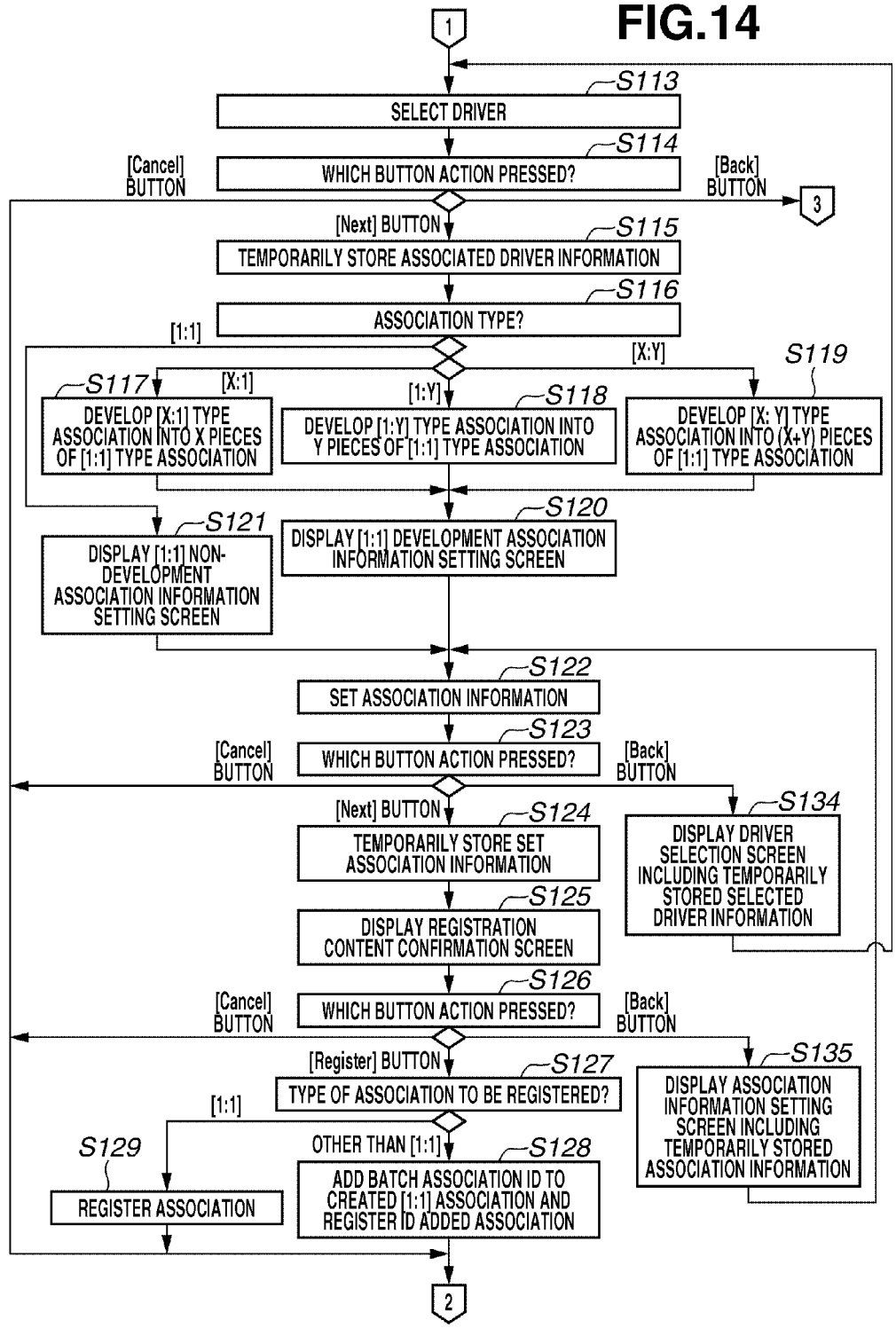
FIG. 14 is a flowchart illustrating a part of processing that corresponds to an association creation function according to the third exemplary embodiment of the present invention.

Hereinafter, processing that corresponds to the association creation function according to the third exemplary embodiment is described below with reference to FIGS. 4 and 14. FIG. 14 is a flowchart illustrating a part of processing that corresponds to the association creation function according to the third exemplary embodiment. The flowchart illustrated in FIG. 14 is different from the flowchart illustrated in FIG. 5 in that an additional step S119 is provided. Steps similar to those illustrated in FIG. 5 are denoted by the same step numbers. The driver management unit 220 executes the processing in the flowchart illustrated in FIG. 14. More specifically, to realize the processing in the flowchart illustrated in FIG. 14, the CPU 100 of the management server 1000 reads a computer readable program from the HDD 109 and executes the readout program.

Although not illustrated in FIGS. 4 and 14, if the [X:Y] button 925 is pressed on the driver selection screen illustrated in FIG. 13, the driver management unit 220 temporarily stores the driver information selected from the driver selection screen in the data storage unit 230. The processing returns to step S108 illustrated in FIG. 4, to enable a user to select another device-driver combination. Further, when the driver information selected from the driver selection screen is temporarily stored in the data storage unit 230 in step S115 illustrated in FIG. 14, the driver management unit 220 stores each device-driver combination if a plurality of device-driver combinations is selected.

Further, in step S116 illustrated in FIG. 14, if a plurality of devices is selected and a plurality of drivers is selected, the driver management unit 220 determines that the association type is [X:Y]. Thus, the processing proceeds to step S119. In step S119, the driver management unit 220 develops the [X:Y] type association into Z pieces of [1:1] type association. Then, the processing proceeds to step S120. If a case where "X:Y" is a combination of "x:1" and "1:y", the value Z is equal to a sum of x and y, i.e., "Z=x+y." Further, if "X:Y" is a combination of "x1:1", "x2:1", "1:y1", and "1:y2", the value Z is equal to a sum of x1, x2, y1, and y2, i.e., "Z=x1+x2+y1+y2." Processing to be performed in step S120 and subsequent steps is similar to that described with reference to FIG. 5 and therefore the description thereof is not repeated.

[Description of Management Function]

Hereinafter, processing that corresponds to the association management function according to the third exemplary embodiment is described below with reference to FIG. 15.

Figure 15:
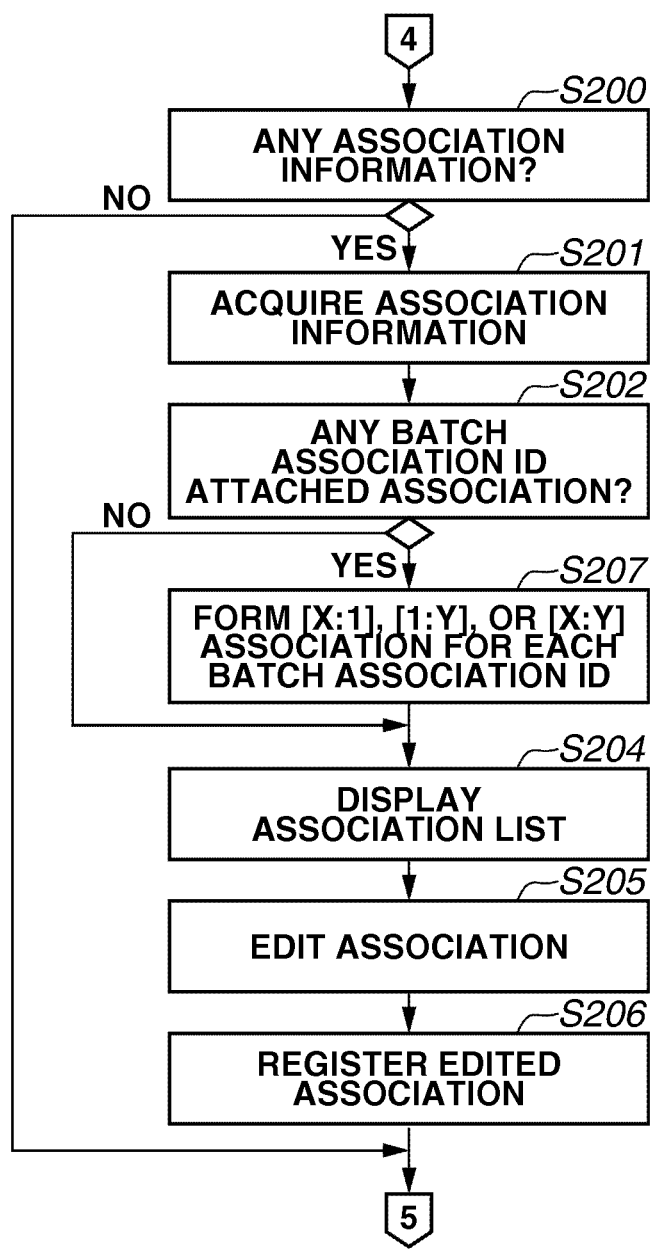
FIG. 15 is a flowchart illustrating an example of processing that corresponds to an association management function according to the third exemplary embodiment of the present invention.

FIG. 15 is a flowchart illustrating an example of the processing that corresponds to the association management function according to the third exemplary embodiment. The flowchart illustrated in FIG. 15 is similar to the flowchart illustrated in FIG. 6 except that step S203 is replaced by step S207. Steps similar to those illustrated in FIG. 6 are denoted by the same step numbers.

In step S207, the driver management unit 220 forms an [X:1], [1:Y], or [X:Y] type association for each batch association ID. Then, the processing proceeds to step S204. Processing to be performed in steps S200 to S202 and steps S204 to S206 are similar to that described with reference to FIG. 6 and therefore the description thereof is not repeated.

[Description of Display Function]

Hereinafter, processing that corresponds to the association display function according to the third exemplary embodiment is described below with reference to FIG. 16.

FIG. 16 is a flowchart illustrating an example of the processing that corresponds to the association display function according to the third exemplary embodiment. The flowchart illustrated in FIG. 16 is similar to the flowchart illustrated in FIG. 7 except that step S500 to step S504 are newly added. Steps similar to those illustrated in FIG. 7 are denoted by the same step numbers.

If the determination result by the driver management unit 220 is NO in step S306, or after completing the processing in step S309, the processing proceeds to step S500.

In step S500, the driver management unit 220 determines whether the [X:Y] type association is present in the association list acquired by the data storage unit 230 in step S300. If the driver management unit 220 determines that the [X:Y] type association is not present in the association list acquired by the data storage unit 230 in step S300 (NO in step S500), the processing proceeds to step S308.

On the other hand, if the driver management unit 220 determines that the [X:Y] type association is present in the association list acquired by the data storage unit 230 in step S300 (YES in step S500), the processing proceeds to step S501. For example, if the association name [association E] including the [X:Y] type association of [5:4] illustrated in FIG. 19 is present, the driver management unit 220 determines that the [X:Y] type association is present.

In step S501, the driver management unit 220 determines whether the existing [X:Y] type association is composed of a plurality of associations. Then, if the driver management unit 220 determines that the [X:Y] type association is composed of a plurality of associations (YES in step S501), the processing proceeds to step S503.

For example, the [association E] illustrated in FIG. 19 is composed of the [1:2] type association, the [1:1] type association, and the [3:1] type association. The [1:2] type association associates the [device 2a] with the [driver A] and the

[driver C]. Further, the [1:1] type association associates the [device 3a] with the [driver B]. Further, the [3:1] type association associates the [device 4a], the [device 4b], and the [device 4c] with the [driver D].

In step S503, the driver management unit 220 decomposes the [X:Y] type association into the [1:1], [X:1], [1:Y] and [X:Y] type associations. Then, the processing proceeds to step S504. For example, the driver management unit 220 decomposes the [association E] illustrated in FIG. 19 into the [1:2], [1:1] and [3:1] type associations.

Figure 8:
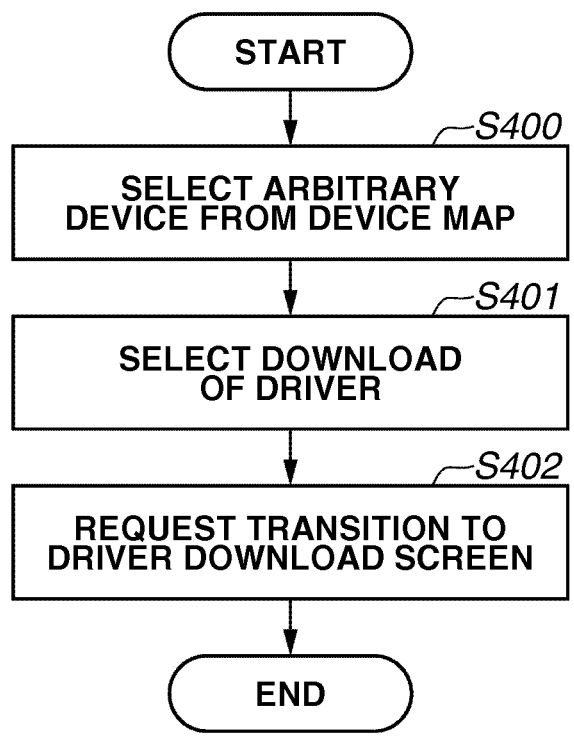
FIG. 8 is a flowchart illustrating request processing in a device map usage PULL mode.

In step S504, the driver management unit 220 extracts an association that corresponds to the device information identified in step S303 (more specifically, the device selected by the client 3000 in step S400 illustrated in FIG. 8), from the associations decomposed in step S503. Then, the processing returns to step S305. For example, in a case where a device having the device name [device 2a] is selected, the driver management unit 220 extracts the [1:2] type association that includes the [device 2a] in the [association E] illustrated in FIG. 19.

Then, if the driver management unit 220 determines that the [X:Y] type association is not composed of a plurality of associations (NO in step S501), the processing proceeds to step S502.

In step S502, the driver management unit 220 temporarily stores the association extracted in step S504, as the [1:1] or [1:Y] type association that corresponds to the selected device, in the data storage unit 230. Then, the processing proceeds to step S308. Processing to be performed in step S308 and subsequent steps is similar to that described with reference to the flowchart illustrated in FIG. 7 and therefore the description thereof is not repeated.

As described above, even in a case where the [X:Y] type association is present, the driver management unit 220 can extract only an association that corresponds to the device selected by the client 3000 in step S400 illustrated in FIG. 8 by executing the above-described processing in step S500 to step S504.

FIGS. 17A and 17B illustrate examples of association selection screens according to the third exemplary embodiment. FIG. 17A illustrates an association selection screen that corresponds to the ordinary PULL mode. FIG. 17B illustrates an association selection screen that corresponds to the device map usage PULL mode.

According to the present exemplary embodiment, with respect to the association between a device (printing apparatus) as a unit of selection when a driver is installed on the client and the driver, especially in the [X:Y] type association, a user interface that enables a user to perform appropriate association display/selection can be provided with reference to the operation mode conformation and the association conformation for the driver installation, in the device-driver association selection. Thus, the simplification of the selection processing and the appropriate installation can be realized. As a result, the operability of the IT administrator can be improved and management costs of a computer system can be reduced.

According to the above-described second and third exemplary embodiments, the processing includes explicitly selecting an association mode, determining whether the selected mode is the "batch association creation mode" or the "ordinary association creation mode." If the selected mode is the "batch association creation mode", the processing further includes developing the non-[1:1] type association into [1:1] type associations and registering the developed associations.

However, the present invention is not limited to the above-described configuration. For example, processing according to a fourth exemplary embodiment includes determining a predetermined value in advance, and automatically setting the "batch association creation mode" if the X or Y value of [X:1], [1:Y] and [X:Y] exceeds the predetermined value and set the "ordinary association creation mode" if the X and Y values do not exceed the predetermined value.

According to the fourth exemplary embodiment, usability can be improved because an IT administrator is not required to explicitly select an association mode.

In the above-described second exemplary embodiment (see step S117 to step S118 illustrated in FIG. 5), and in the above-described third exemplary embodiment (see step S117 to step S119 illustrated in FIG. 14), more specifically before displaying the "batch association creation mode" association information setting screen (see FIG. 9D), the processing includes developing the non-[1:1] type association into [1:1] type associations. However, the present invention is not limited to the above-described configuration. For example, as illustrated in a flowchart in FIG. 18, it is useful to perform the [1:1] type association development and registration processing when an association registration screen is displayed.

Figure 18:
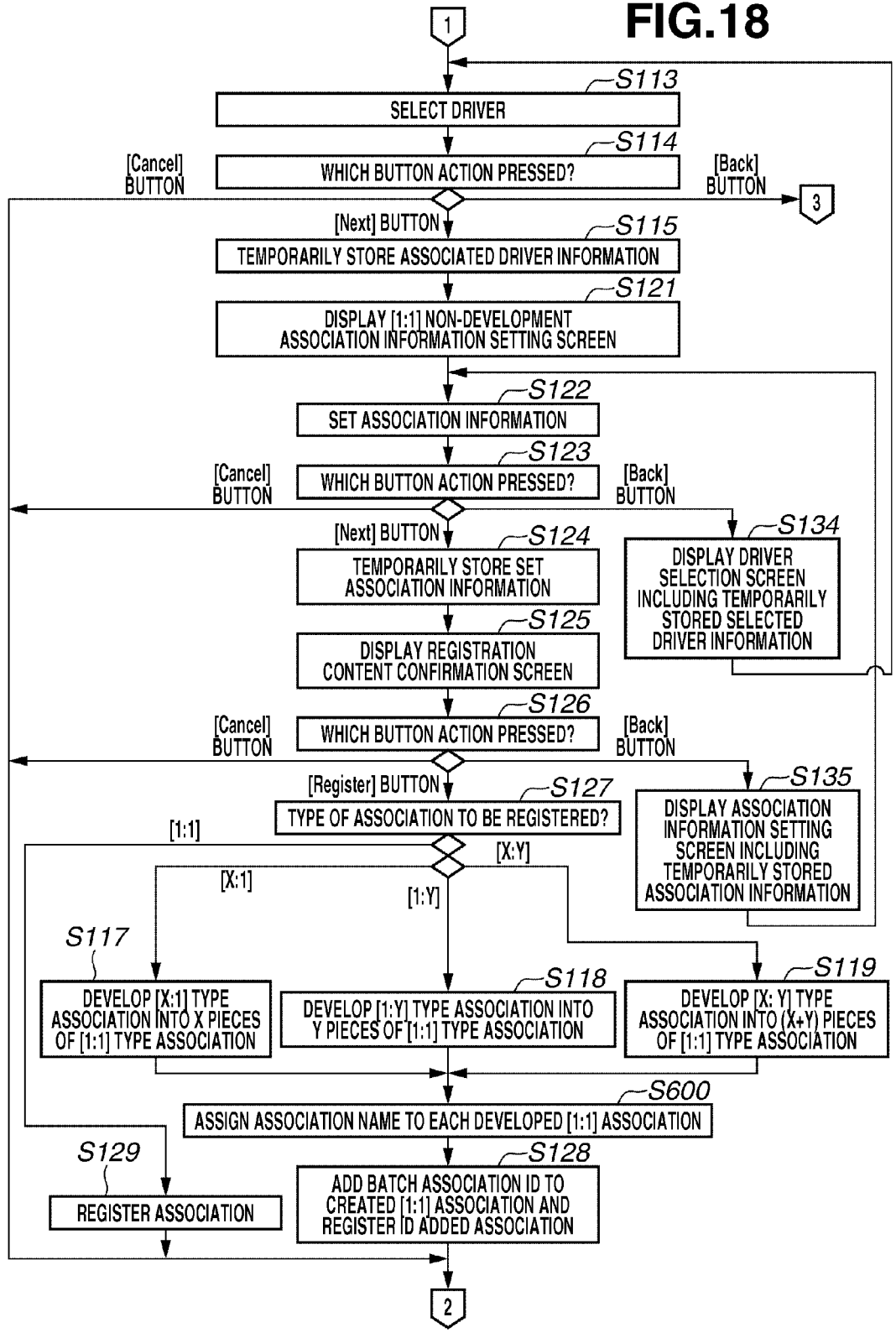
FIG. 18 is a flowchart illustrating a part of processing that corresponds to an association creation function according to a fifth exemplary embodiment of the present invention.

Hereinafter, example processing that corresponds to the association creation function according to a fifth exemplary embodiment is described below with reference to FIG. 18. FIG. 18 is a flowchart illustrating a part of the processing that corresponds to the association creation function according to the fifth exemplary embodiment. In FIG. 18, steps similar to those in FIGS. 5 and 14 are denoted by the same step numbers. The driver management unit 220 executes the processing in the flowchart illustrated in FIG. 18. More specifically, to realized the processing illustrated in FIG. 18, the CPU 100 of the management server 1000 reads a computer readable program from the HDD 109 and executes the readout program.

As illustrated in FIG. 18, if the processing of the above-described step S115 is completed, then in step S121, the driver management unit 220 performs [1:1] non-development association information setting screen display processing. More specifically, the driver management unit 220 generates a [1:1] non-development association information setting screen (not illustrated) and transmits the generated setting screen to the client 3000. The client 3000 receives the [1:1] non-development association information setting screen and displays the received setting screen on the display device 105.

In the present exemplary embodiment, in step S121, the driver management unit 220 sets association information on the [1:1] non-development association information setting screen, irrespective of the association type, instead of setting the association information according to the association type as illustrated in step S120 and step S121 in FIG. 5 or 14.

Next, as illustrated in FIG. 18, the driver management unit 220 performs processing in step S117 to step S119 after completing the processing in step S127. Then, in step S600, the driver management unit 220 automatically assigns an association name to each association having been developed into a [1:1] type. For example, in a case where the association name is "association D", the driver management unit 220 sets the "association D" as an alternative association name and assigns association names "association D_1" and "association D_2" illustrated in FIG. 9E as association names.

Then, in step S128, the driver management unit 220 performs registration processing that includes adding a batch association ID that corresponds to the "alternative association name" to the association information that has been developed into the [1:1] type association in step S117 to step S119 and having the association name assigned in step S600.

According to the present exemplary embodiment, usability can be improved because an IT administrator is not required to set an association name for each developed association.

As described above, according to the exemplary embodiments of the present invention, a user interface that enables a user to perform appropriate association display/selection can be provided with reference to the operation mode conformation and the association conformation for the driver installation, in the device-driver association selection. Thus, the selection processing can be simplified and the installation can be realized appropriately. As a result, the operability of the IT administrator can be improved and management costs of a computer system can be reduced.

It is needless to say that the above-described various data pieces are not limited to specific data in configuration and content and can be modified in various ways considering its usage and purpose.

In each of the above-described exemplary embodiments, the image forming apparatus serves as an example of the "device" and the printer driver serves as an example of the "driver." However, a scanner driver of a multifunction peripheral can serve as a "driver" according to the present invention. Further, another computer peripheral apparatus can serve as a "device" and a device driver of the computer peripheral apparatus can serve as a "driver" to realize the present invention.

The present invention is not limited to the above-described exemplary embodiments. For example, the present invention can be embodied as a system, an apparatus, a method, a program, or a storage medium. More specifically, the present invention can be applied to a system including a plurality of devices or to an apparatus including only one device. Further, the configurations described in the above-described exemplary embodiments can be combined to realize the present invention.

Further, the present invention can be realized by executing the following processing. More specifically, the processing includes providing software (a program) that can realize the functions of the above-described exemplary embodiments to a system or an apparatus via a network or an appropriate storage medium and causing a computer (or a CPU, a microprocessing unit (MPU), and/or the like) of the system or the apparatus to read and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-086941 filed Apr. 11, 2011, which is hereby incorporated by reference herein in its entirety.

What is claimed is:

1. A server apparatus comprising:
a creation unit configured to create association information that associates one or a plurality of image forming apparatuses with one or a plurality of printer drivers that correspond to the one or the plurality of image forming apparatuses;
a data storage unit configured to store the association information created by the creation unit;
a driver storage unit configured to store the printer drivers;
a transmission unit configured to transmit a list of the association information stored in the data storage unit to a client apparatus in response to a request from the client apparatus;
a reception unit configured to receive association information selected from the list of the association information from the client apparatus;
a distribution unit configured to acquire a printer driver that corresponds to the association information selected from the list from the driver storage unit and distribute the acquired printer driver to a predetermined client apparatus, in such a way as to install a logical printer of an image forming apparatus that corresponds to the association information selected from the list and received by the reception unit on the predetermined client apparatus; and
a setting unit configured to set a first creation mode or a second creation mode as a creation mode if the creation unit creates association information,
wherein, if association information created in a state where the second creation mode is set does not associate an image forming apparatus with a printer driver in a one-to-one relationship, the creation unit develops the association information into association information that associates the image forming apparatus with the printer driver in a one-to-one relationship and store the developed association information in the data storage unit, and further the creation unit stores association information created in a state where the first creation mode is set in the data storage unit without performing the development.

2. The server apparatus according to claim 1, further comprising a management unit configured to generate a management screen that enables a user to edit the association information stored in the data storage unit,
wherein the creation unit adds identification information that ties association information developed from one of the association information pieces and store the identification information added association information in the data storage unit, and
the management unit generates a management screen that displays the identification information added association information in a state where the association information is classified according to the identification information.

3. The server apparatus according to claim 1, wherein in a case where the list is requested in a first operation mode for installing a printer driver chiefly by the server apparatus from the client, the distribution unit distributes the printer driver to one or a plurality of client apparatuses having been set in advance, and in a case where the list is requested in a second operation mode for installing a printer driver chiefly by the client apparatus from the client, the distribution unit distributes the printer driver to the client apparatus.

4. The server apparatus according to claim 1, further comprising:
a map image transmission unit configured to transmit to the client apparatus a map image including an icon indicating an installation position of an image forming apparatus in response to a request from the client apparatus, and
an extraction unit configured to extract association information that includes the image forming apparatus that corresponds to an icon selected on the map image, from the association information stored in the data storage unit, if a request of an association information list that includes the image forming apparatus that corresponds to the icon selected on the map image is received from the client apparatus,
wherein the transmission unit transmits a list of the association information extracted by the extraction unit to the client apparatus in response to the request of the association information list that includes the image forming apparatus that corresponds to the icon selected on the map image.

5. The server apparatus according to claim 1, wherein each of the first creation mode and the second creation mode includes an upper limit with respect to the number of image forming apparatuses that can be associated and an upper limit with respect to the number of printer drivers that can be associated.

6. The server apparatus according to claim 5, wherein the setting unit sets the second creation mode if an instructed creation of the association information exceeds the upper limit of the number of image forming apparatuses that can be associated according to the first creation mode or the upper limit of the number of printer drivers that can be associated according to the first creation mode.

7. A method for a server apparatus, the method comprising:
creating association information that associates one or a plurality of image forming apparatuses with one or a plurality of printer drivers that correspond to the one or the plurality of image forming apparatuses and storing the created association information in a data storage unit;
transmitting a list of the association information stored in the data storage unit to a client apparatus in response to a request from the client apparatus;
receiving association information selected from the list of the association information from the client apparatus;
acquiring a printer driver that corresponds to the association information selected from the list from the driver storage unit and distributing the acquired printer driver to a predetermined client apparatus, in such a way as to install a logical printer of an image forming apparatus that corresponds to the association information selected from the received list on the predetermined client apparatus; and
setting a first creation mode or a second creation mode as a creation mode if the association information is created,
wherein, association information created in a state where the second creation mode is set does not associate an image forming apparatus with a printer driver in a one-to-one relationship is developed into association information that associates the image forming apparatus with the printer driver in a one-to-one relationship and stored in the data storage unit, and association information created in a state where the first creation mode is set is stored in the data storage unit without being developed.

8. A computer readable non-transitory storage medium that stores a computer program that causes a computer to execute a method for a sever apparatus, the computer program comprising steps of:
creating association information that associates one or a plurality of image forming apparatuses with one or a plurality of printer drivers that correspond to the one or the plurality of image forming apparatuses and storing the created association information in a data storage unit;
transmitting a list of the association information stored in the data storage unit to a client apparatus in response to a request from the client apparatus;
receiving association information selected from the list of the association information from the client apparatus;
acquiring a printer driver that corresponds to the association information selected from the list from the driver storage unit and distributing the acquired printer driver to a predetermined client apparatus, in such a way as to install a logical printer of an image forming apparatus that corresponds to the association information selected from the received list on the predetermined client apparatus; and
setting a first creation mode or a second creation mode as a creation mode if the association information is created,
wherein, association information created in a state where the second creation mode is set does not associate an image forming apparatus with a printer driver in a one-to-one relationship is developed into association information that associates the image forming apparatus with the printer driver in a one-to-one relationship and stored in the data storage unit, and association information created in a state where the first creation mode is set is stored in the data storage unit without being developed.

* * * * *